United States Patent
Jayetileke et al.

(10) Patent No.: US 9,389,641 B2
(45) Date of Patent: *Jul. 12, 2016

(54) CARRYING CASE WITH PEEK FUNCTIONALITY

(71) Applicant: RESEARCH IN MOTION LIMITED, Waterloo (CA)

(72) Inventors: Samanthi Frances Jayetileke, Kitchener (CA); Alan James Deciantis, Kitchener (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 453 days.

This patent is subject to a terminal disclaimer.

(21) Appl. No.: 13/891,459

(22) Filed: May 10, 2013

(65) Prior Publication Data

US 2014/0332441 A1   Nov. 13, 2014

(51) Int. Cl.
| | |
|---|---|
| G06F 1/16 | (2006.01) |
| B65D 85/00 | (2006.01) |
| B65D 73/00 | (2006.01) |
| A45C 11/00 | (2006.01) |
| H04B 1/3888 | (2015.01) |

(52) U.S. Cl.
CPC ............. *G06F 1/1628* (2013.01); *A45C 11/00* (2013.01); *H04B 1/3888* (2013.01); *A45C 2011/002* (2013.01)

(58) Field of Classification Search
CPC   G06F 1/1628; A45C 11/00; A45C 2011/002; A45C 2011/003
USPC ........ 361/679.55–679.59; 206/320, 744, 467, 206/468
See application file for complete search history.

(56) References Cited

U.S. PATENT DOCUMENTS

| | | |
|---|---|---|
| 5,128,829 A | 7/1992 | Loew |
| 5,295,089 A | 3/1994 | Ambasz |
| 5,607,054 A | 3/1997 | Hollingsworth |
| 5,712,760 A | 1/1998 | Coulon et al. |
| 5,808,862 A | 9/1998 | Robbins |
| 5,887,723 A | 3/1999 | Myles et al. |
| D435,550 S | 12/2000 | Chu et al. |
| 6,301,098 B1 | 10/2001 | Kim |
| 6,700,773 B1 | 3/2004 | Adriaansen et al. |
| 6,763,942 B1 | 7/2004 | Yeh |

(Continued)

FOREIGN PATENT DOCUMENTS

| | | |
|---|---|---|
| EP | 1435766 A1 | 7/2004 |
| GB | 2482931 A | 2/2012 |
| GB | 2496109 A | 5/2013 |

OTHER PUBLICATIONS

Corresponding European Patent Application No. 13167381.6 Search Report dated Sep. 30, 2013.

(Continued)

*Primary Examiner* — Nidhi Thaker
(74) *Attorney, Agent, or Firm* — Perry + Currier, Inc.

(57) ABSTRACT

A carrying case with peek functionality is provided. The carrying case comprises: a device holding portion configured to receive a mobile device, the device holding portion comprising a gap for exposing an indicator of the mobile device; and a sliding portion configured to move between a closed position and an open position, the sliding portion obscuring the gap in the closed position and exposing at least a portion of the gap in the open position, the sliding portion being about planar.

18 Claims, 28 Drawing Sheets

(56) References Cited

U.S. PATENT DOCUMENTS

| | | |
|---|---|---|
| 6,774,888 B1 | 8/2004 | Genduso |
| 6,914,776 B2 | 7/2005 | Kim |
| 6,976,799 B2 | 12/2005 | Kim et al. |
| 6,999,804 B2 | 2/2006 | Engstrom et al. |
| 7,054,146 B2 | 5/2006 | Sutton et al. |
| 7,072,699 B2 | 7/2006 | Eiden |
| 7,085,542 B2 | 8/2006 | Dietrich et al. |
| 7,197,347 B2 | 3/2007 | Chen |
| 7,327,560 B1 | 2/2008 | Tabasso et al. |
| 7,454,239 B2 | 11/2008 | Infanti |
| 7,536,562 B2 | 5/2009 | Little et al. |
| 7,540,379 B2 | 6/2009 | Yau |
| D596,176 S | 7/2009 | Kim et al. |
| 7,584,841 B2 | 9/2009 | Chan et al. |
| 7,672,119 B2 | 3/2010 | Hollander |
| D621,396 S | 8/2010 | Lee et al. |
| 7,831,284 B2 * | 11/2010 | Lee ............... H04M 1/04 455/575.1 |
| 8,081,435 B2 | 12/2011 | Ma et al. |
| 8,170,621 B1 | 5/2012 | Lockwood |
| 8,208,254 B2 | 6/2012 | Duan et al. |
| 8,245,423 B2 | 8/2012 | Goslee |
| 8,279,589 B2 | 10/2012 | Kim |
| 8,290,480 B2 | 10/2012 | Abramson et al. |
| 8,428,665 B1 | 4/2013 | McLaughlin et al. |
| 8,457,564 B2 | 6/2013 | Champion |
| D697,508 S | 1/2014 | Hsu |
| 8,760,294 B2 * | 6/2014 | Pertuit ............... G01R 33/0023 340/500 |
| 8,763,795 B1 | 7/2014 | Oten et al. |
| 8,872,023 B2 | 10/2014 | Chang et al. |
| 8,964,364 B2 | 2/2015 | Abdelsamie et al. |
| D724,090 S | 3/2015 | Kim et al. |
| 8,988,355 B2 | 3/2015 | Solomon et al. |
| 2002/0163778 A1 | 11/2002 | Hazzard et al. |
| 2003/0222149 A1 * | 12/2003 | Solomon ............... G06F 1/1669 235/472.01 |
| 2004/0097256 A1 | 5/2004 | Kujawski |
| 2005/0017953 A1 | 1/2005 | Pekka |
| 2006/0007645 A1 | 1/2006 | Chen et al. |
| 2006/0022822 A1 | 2/2006 | Wong et al. |
| 2006/0201978 A9 | 9/2006 | Nichols, Sr. |
| 2006/0211458 A1 | 9/2006 | Pletikosa |
| 2006/0244728 A1 | 11/2006 | Finke-Anlauff et al. |
| 2007/0211415 A1 | 9/2007 | Seo et al. |
| 2007/0247432 A1 | 10/2007 | Oakley |
| 2007/0247793 A1 | 10/2007 | Carnevali |
| 2008/0053770 A1 | 3/2008 | Tynyk |
| 2008/0096620 A1 | 4/2008 | Lee et al. |
| 2008/0251338 A1 | 10/2008 | Golden et al. |
| 2010/0188299 A1 | 7/2010 | Rinehart et al. |
| 2010/0200456 A1 | 8/2010 | Parkinson |
| 2010/0207888 A1 | 8/2010 | Camiel |
| 2010/0302168 A1 | 12/2010 | Giancarlo |
| 2011/0163642 A1 | 7/2011 | Rohrbach et al. |
| 2011/0188176 A1 | 8/2011 | Kim |
| 2011/0190953 A1 | 8/2011 | Park et al. |
| 2011/0198251 A1 | 8/2011 | Alamo |
| 2011/0241999 A1 | 10/2011 | Thier |
| 2011/0317339 A1 | 12/2011 | Wu et al. |
| 2012/0008269 A1 | 1/2012 | Gengler |
| 2012/0037285 A1 | 2/2012 | Diebel et al. |
| 2012/0044638 A1 | 2/2012 | Mongan et al. |
| 2012/0087100 A1 | 4/2012 | Ku |
| 2012/0106062 A1 | 5/2012 | Probst |
| 2012/0112031 A1 * | 5/2012 | Gormick ............... A45C 11/00 248/371 |
| 2012/0140396 A1 | 6/2012 | Zeliff et al. |
| 2012/0170177 A1 | 7/2012 | Pertuit et al. |
| 2012/0194448 A1 | 8/2012 | Rothkopf |
| 2012/0200999 A1 * | 8/2012 | Chebeleu ............... 361/679.55 |
| 2012/0211377 A1 | 8/2012 | Sajid |
| 2012/0221290 A1 | 8/2012 | Oka et al. |
| 2012/0224316 A1 | 9/2012 | Schulenberger |
| 2012/0265482 A1 | 10/2012 | Grokop et al. |
| 2012/0305413 A1 | 12/2012 | Chung |
| 2012/0328349 A1 | 12/2012 | Isaac |
| 2013/0033806 A1 | 2/2013 | Rochna |
| 2013/0040560 A1 | 2/2013 | Kennedy et al. |
| 2013/0088431 A1 * | 4/2013 | Ballagas ............... G06F 1/1626 345/168 |
| 2013/0111097 A1 | 5/2013 | Pan et al. |
| 2013/0140203 A1 | 6/2013 | Chiang |
| 2013/0155610 A1 * | 6/2013 | Schroeder ............... B23P 11/00 361/679.58 |
| 2013/0214661 A1 | 8/2013 | McBroom |
| 2013/0335904 A1 | 12/2013 | Griffin |
| 2014/0022174 A1 | 1/2014 | Chen |
| 2014/0055363 A1 | 2/2014 | Meierling et al. |
| 2014/0083883 A1 | 3/2014 | Elias |
| 2014/0197048 A1 | 7/2014 | Napolitano et al. |
| 2015/0083615 A1 | 3/2015 | Lay et al. |

OTHER PUBLICATIONS

Related European Patent Application No. 13167374.1 Search Report dated Oct. 2, 2013.

Related European Patent Application No. 13167384.0 Search Report dated Oct. 9, 2013.

Related U.S. Appl. No. 13/891,420, "Notice of Allowance", dated Feb. 2, 2015.

Related U.S. Appl. No. 13/891,517, "Non-Final Rejection" dated Apr. 22, 2015.

U.S. Appl. No. 13/891,420, filed May 10, 2013 Title: A Device for Providing Notifications While Mated With a Carrying Case Inventors: Abdelsamie et al.

"Carrying Case Used With a Portable Electronic Device", U.S. Appl. No. 13/891,517, filed May 10, 2013, Advisory Action with List of References.

* cited by examiner

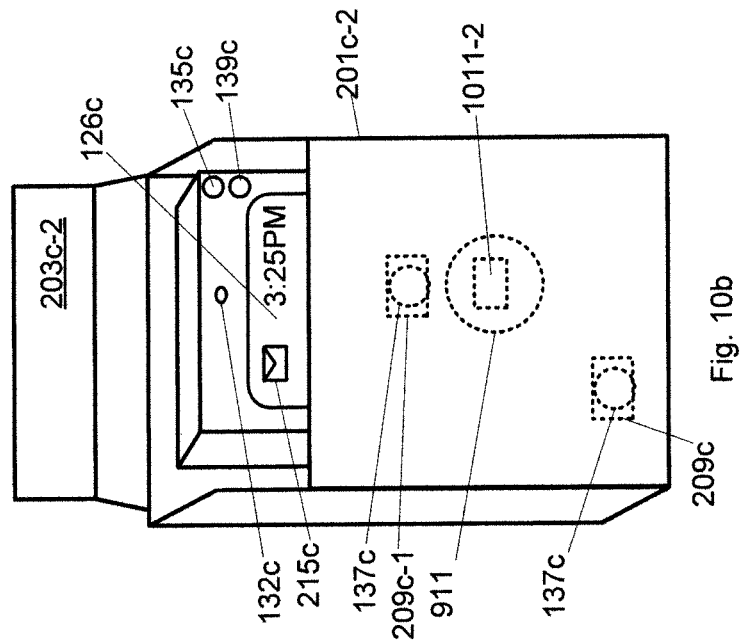
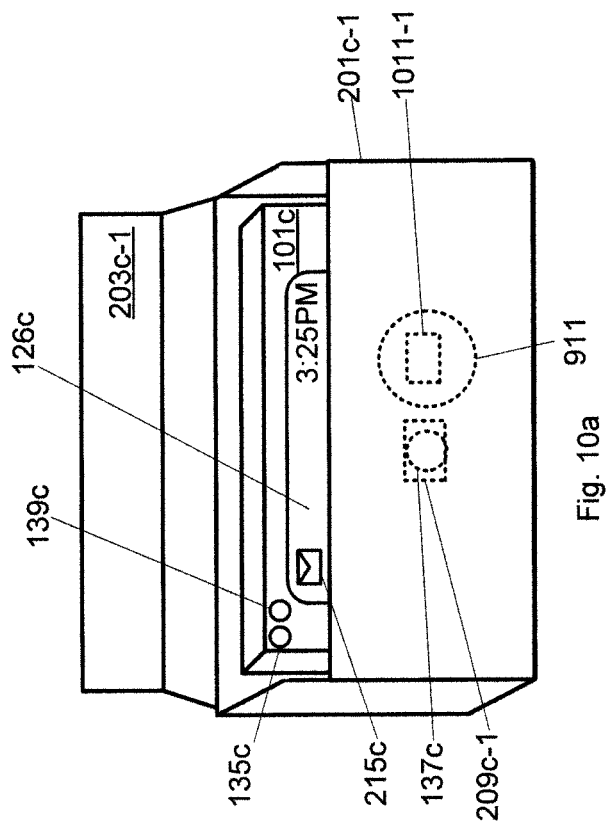

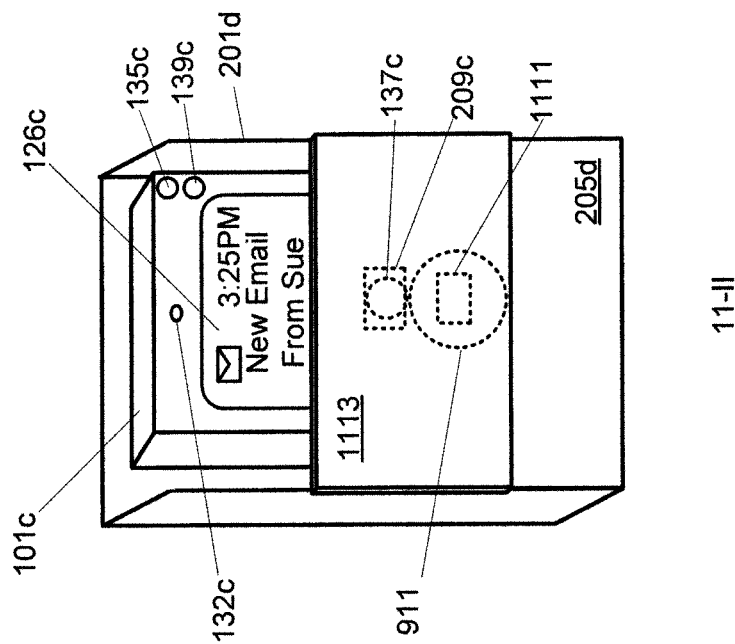
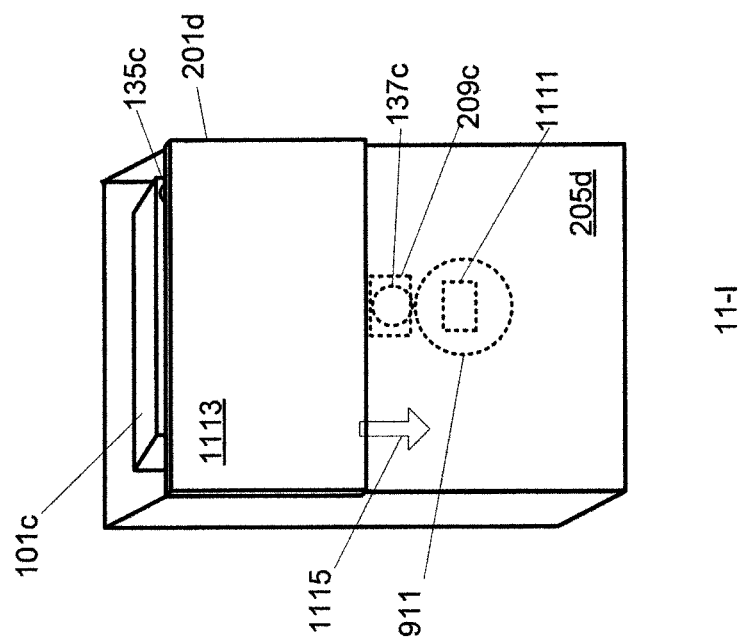
Fig. 11

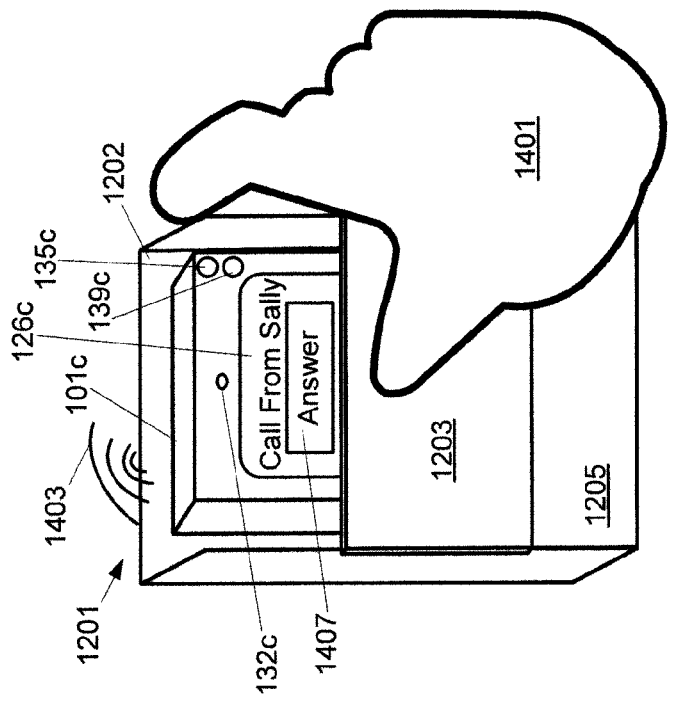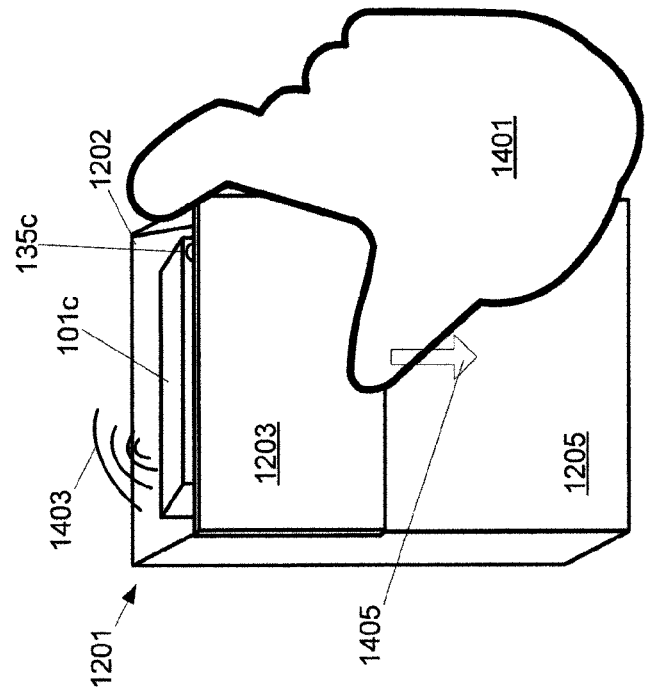
Fig. 14

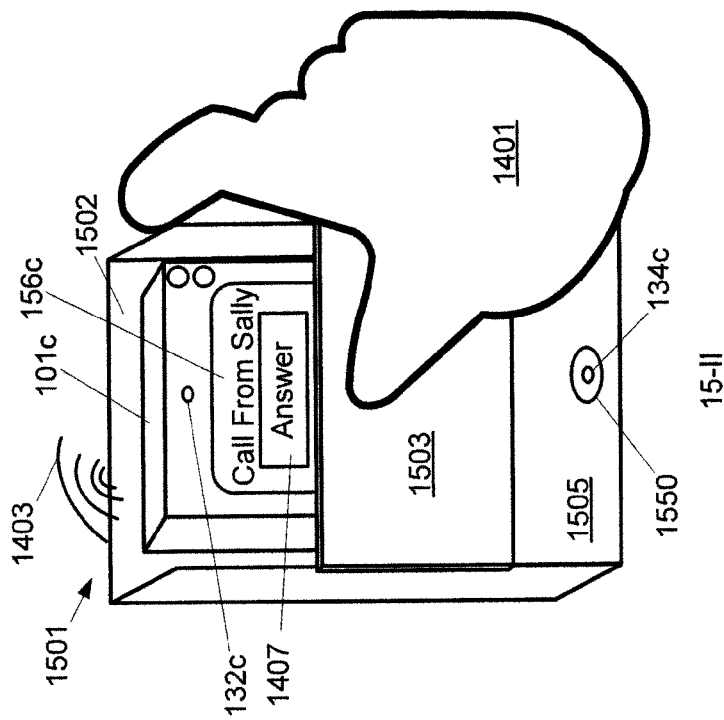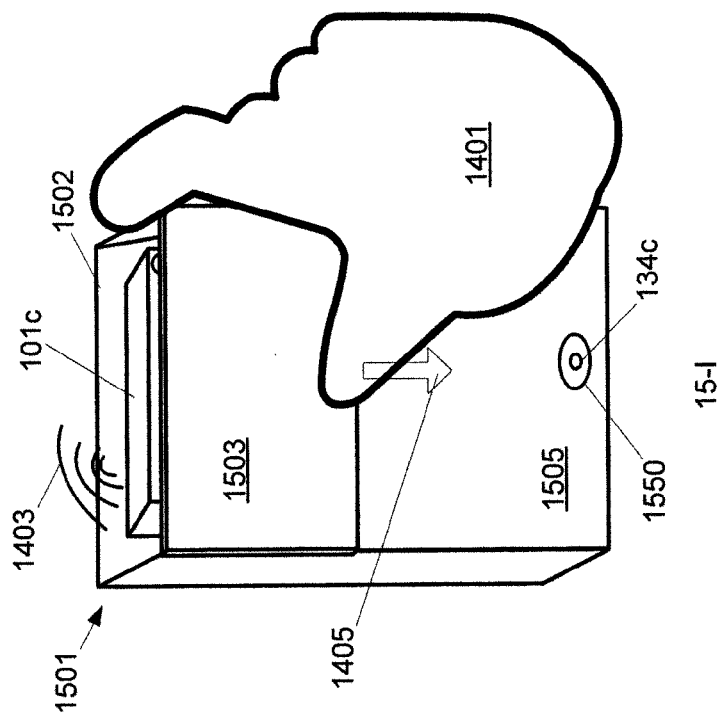
Fig. 15

CARRYING CASE WITH PEEK FUNCTIONALITY

FIELD

The specification relates generally to mobile devices, and specifically to a device for providing notifications while mated with a carrying case.

BACKGROUND

The evolution of computers is currently quite active in the mobile device environment. Notification indicators, such as displays, lights, light emitting diodes (LEDs) and the like can be obscured by the location of the mobile device mated with a carrying case.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 10a depicts the device of FIG. 9 mated with a first carrying case in a first orientation, according to non-limiting implementations.

FIG. 10b depicts the device of FIG. 9 mated with a second carrying case in a second orientation, according to non-limiting implementations.

FIG. 11 depicts the device of FIG. 9 mated with an alternative carrying case in a closed configuration and an open configuration, according to non-limiting implementations.

FIG. 14 depicts, the carrying case of FIG. 12 with the sliding portion in the closed position and the open position with a mobile device received therein, the mobile device receiving a call, according to non-limiting implementations.

FIG. 15 depicts an alternative carrying case comprising sliding portion in a closed position and an open position with a mobile device received therein, the mobile device receiving a call, and the carrying case comprising an aperture correspond to a microphone of the mobile device, according to non-limiting implementations.

DETAILED DESCRIPTION

Figure 1:
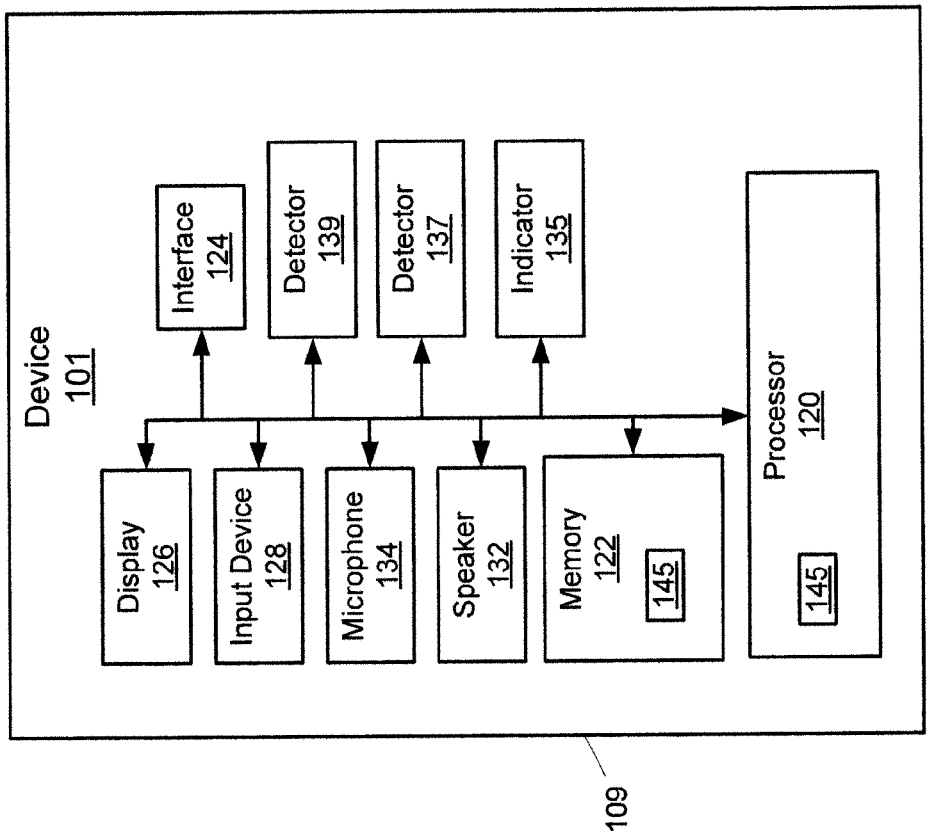
FIG. 1 depicts a block diagram of a device for providing notifications when mated with a carrying case, according to non-limiting implementations.

The present disclosure describes examples of apparatus and techniques by which a mobile device can automatically determine whether it is in a carrying case or not, and whether one or more indicators are exposed or obscured. The mobile device can control the functions of the indicators as a function of that determination.

In general, this disclosure is directed to electronic devices and carrying cases for use with the electronic device, and particularly mobile electronic devices. In general, mobile electronic devices represent electronic devices that are readily movable from place to place. Such devices typically include an indicator for providing notification of events at the mobile electronic device including, but not limited to, receiving messages (e.g. emails, text messages etc.) and phone calls, calendar events, and the like. The indicator can include, for example, a display, a light and/or an LED (light emitting diode), a speaker, a vibratory motor, and the like. When the mobile electronic device is placed in a quiet mode, indicators that provide notifications that can be heard, such as speakers etc. (and in some instances the vibratory motor) are suppressed and quiet notifications are provided via the light/LED (typically located on a front of the mobile electronic device, adjacent the display) and/or the display. However, when the mobile electronic device is in the quiet mode and/or placed in a holster, the quiet notifications are obscured and/or hidden, which causes the notifications to be missed and hence the events that caused the notifications can also be missed. This can be especially problematic when the events are time specific, such as phone calls, calendar reminders and the like. This specification describes various implementations of a carrying case that can be mated with a mobile device to peek at an indicator of the mobile device for example a display, a light, and LED and the like.

In this specification, elements may be described as "enabled to" perform one or more functions or "enabled for" such functions. In general, an element that is enabled to perform or enabled for performing a function is configured to perform the function, or is suitable for performing the function, or is adapted to perform the function, or is operable to perform the function, or is otherwise capable of performing the function.

Furthermore, as will become apparent, in this specification certain elements may be described as mated, coupled or connected physically, electronically, optically, communicatively, mechanically or any combination thereof, according to context. Hence, in this disclosure, "enabled to mate" refers to a communicative coupling and typically a physical coupling as well. In general, components that are communicatively coupled are configured to communicate (that is, they are capable of communicating) in any fashion for any duration, such as by way of electric signals, optical signals, wireless signals, or any combination thereof. The communication may be one-way or two-way communication. Components are "physically coupled" when they are attached or connected or joined to one another, in any fashion, whether releasably or substantially permanently, so that physical activity of one component generally affects the other. The physical attachment may be direct or by way of one or more intermediate elements. According to context, two components that are physically coupled may behave as a single element. In some cases, physically coupled elements may be integrally formed, e.g., part of a single-piece article that may share structures and materials. In other cases, physically coupled elements may comprise discrete components that may be fastened together in any fashion. Physical coupling may also include a combination of discrete components fastened together, and components fashioned as a single piece.

In this specification, elements may be described as "obscured" and/or "exposed". In general, an element that is obscured is one or more of not visible to a user, not viewable, covered, blocked, concealed, hidden, and the like. Similarly, an element that is exposed is one or more of visible to a user, uncovered, revealed, viewable, and the like. Whether an element is obscured or exposed may depend upon a "configuration," that is, an arrangement of physical components, such as the arrangement of elements of a carrying case.

Also, in this specification, devices or components may be described as being in one or more "modes." In general, a mode is directed to a way or manner of operating. In one mode, functionality of one or more components may be enabled to operate in a normal fashion, for example, while in another mode, the components or portions thereof may be idle or deactivated or enhanced. Modes involve a variety of disparate functional elements or related functional elements. In addition, several modes may apply to a particular function; as will be discussed below, a notification mode can refer to any of several distinct modes related to notification, such as a customized notification mode, a peek notification mode, a temporary notification mode, a special notification mode, and so on.

The present specification provides a carrying case comprising: a device holding portion configured to receive a mobile device, the device holding portion comprising a gap for exposing an indicator of the mobile device; and a sliding portion configured to move between a closed position and an open position, the sliding portion obscuring the gap in the closed position and exposing at least a portion of the gap in the open position, the sliding portion being about planar.

The device holding portion can comprise at least a front wall and the gap can be located in the front wall.

The gap can comprise one or more of an aperture in a front wall of the device holding portion, a cut-out of the front wall, and an opening of the front wall.

The device holding portion can comprise a longitudinal axis and the device holding portion can be configured to receive the mobile device along the longitudinal axis. The sliding portion can be configured to move between the closed position and the open position along the longitudinal axis.

The carrying case can further comprise a biasing mechanism configured to bias the sliding portion to at least the closed position.

The sliding portion can be biased towards the closed position.

The sliding portion can be biased towards both the closed position and the open position such that when the sliding portion is displaced from either of the closed position and the open position, the sliding portion moves to one of the closed position and the open position depending on a position of the sliding portion relative to the device holding portion.

The carrying case can further comprise a biasing mechanism configured to bias the sliding portion to both the closed position and the open position such that the sliding portion moves to one of the closed position and the open position depending on a position of the sliding portion relative to the device holding portion.

The carrying case can further comprise a biasing mechanism configured to: move the sliding portion to the closed position when the sliding portion is moved more than halfway from the open position towards the closed position; and, move the sliding portion to the open position when the sliding portion is moved more than halfway from the closed position towards the open position.

The carrying case can further comprise a biasing mechanism configured to bias the sliding portion to at least the closed position.

The sliding portion can be configured to be frictionally retained at positions between the closed position and the open position.

A size of the sliding portion can be about a same size as the gap.

The sliding portion can cover a front wall of the device holding portion in both the open position and the closed position, the front wall comprising the gap.

The sliding portion can comprise side walls that slide along corresponding side walls of the device holding portion.

The sliding portion can be configured to be operated with one hand.

The carrying case can further comprise one or more apertures in at least one of the device holding portion and the sliding portion, the one or more apertures corresponding to one or more of a position of a speaker and a microphone of the mobile device, when the mobile device is received by the device holding portion.

FIG. 1 depicts a device 101 for providing notifications while mated with a carrying case and/or in a carrying case, according to non-limiting implementations. Device 101 comprises a housing 109, which houses a processor 120 interconnected with: a memory 122; a communications interface 124; a display 126; an input device 128; a speaker 132; a microphone 134; and an indicator 135. Although shown in FIG. 1 as distinct elements, the display 126 may be considered as one kind of indicator, in that a display can function to provide notification to a user. Device 101 further comprises a first detector 137 configured to detect when device 101 is mated with a carrying case, the carrying case having an open configuration and a closed configuration, wherein indicator 135 is hidden in the closed configuration and at least partially exposed in the open configuration; and, a second detector 139 configured to detect when the carrying case is in the open configuration. Processor 120 is configured to place indicator 135 in a given notification mode when first detector 137 detects that device 101 is mated with the carrying case and second detector 139 detects that the carrying case is in the open configuration. Communications interface 124 will be interchangeably referred to as interface 124.

Processor 120 is further configured to place indicator 135 in one or more of a sleep mode and a carrying case mode when first detector 137 detects that the device is in the carrying case and second detector 139 detects that the carrying case is in the closed configuration.

In some implementations, the sleep mode and the carrying case mode can be similar and indicator 135 behaves similarly in each of these modes; in other implementations, indicator 135 can behave differently in each of these modes. For example, in the sleep mode, indicator 135 is not used and/or not turned on, while in the carrying case mode, indicator 135 is turned on only when predetermined conditions are met, which can include, but is not limited to, receiving a message marked "important", receiving a phone call, and the like.

It is further appreciated that device 101 and/or indicator 135 and/or display 126 can enter a notification mode: for example, in some notification modes, processor 120 controls indicator 135 and/or display 126 to provide a notification of an event, including, but not limited to, receipt of a message (e.g. emails, text messages etc.), receipt of a phone call, a calendar event and/or a calendar event reminder as indicated in, for example, a calendar database, and the like.

However, device 101 and/or indicator 135 and/or display 126 can enter a given notification mode different from a normal notification mode when first detector 137 detects that device 101 is mated with a carrying case and second detector 139 detects that the carrying case is in the open configuration, as explained in further detail below. The given notification mode can include, but is not limited to: a customized notification mode, a peek notification mode, a temporary notification mode, a special notification mode, and the like.

In a non-limiting example, indicator 135 can comprise a light, including, but not limited to, an LED (light emitting diode), or the like, and processor 120 controlling indicator 135 comprises processor 120 controlling the light to at least turn on to provide a notification, including, but not limited to, one or more of blink, change colour or the like. When indicator 135 is a display 126, turning on indicator 135 may include mimicking an LED, blinking, flashing, changing colour, displaying text or displaying graphics, or any combination thereof. As will be discussed below, turning on display 126 does not necessarily entail turning on the entire display 126.

It is appreciated that FIG. 1 further depicts a block diagram of device 101, which will hereafter be described in further detail. It should be emphasized that the structure of device 101 in FIG. 1 is purely an example. For example, as depicted in FIG. 1, it is contemplated that device 101 comprises a device that can be used for implementing both wireless voice (e.g. telephony) and wireless data communications (e.g. email, web browsing, text, and the like), as well as any other specialized functions, including, but not limited, to one or more of, computing, and/or entertainment related functions.

Further, device 101 can be any type of electronic device that can be used in a self-contained manner to process applications, including but not limited to, gaming applications. Device 101 includes, but is not limited to, any suitable combination of mobile electronic devices, mobile communications devices, mobile computing devices, portable electronic devices, portable computing devices, portable navigation devices, tablet computing devices, telephones, PDAs (personal digital assistants), cellphones, smartphones, e-readers, internet-enabled appliances and the like. It is further appreciated that some mobile devices may be handheld, that is, sized and shaped to be held and carried in a human hand, and used while held or carried. Other suitable devices are within the scope of present implementations.

Device 101 comprises at least one input device 128 generally enabled to receive input data, and can comprise any suitable combination of input devices, including but not limited to a keyboard, a keypad, a pointing device, a mouse, a track wheel, a trackball, a touchpad, a touch screen and the like. Other input devices are within the scope of present implementations.

Input data from input device 128 is received at processor 120 (which can be implemented as a plurality of processors, including but not limited to one or more central processors (CPUs). Processor 120 is configured to communicate with a memory 122 comprising a non-volatile storage unit (e.g. Erasable Electronic Programmable Read Only Memory ("EEPROM"), Flash Memory, and the like) and a volatile storage unit (e.g. random access memory ("RAM"), and the like). Programming instructions that implement the functional teachings of device 101 as described herein are typically maintained, persistently, in memory 122 and used by processor 120 which makes appropriate utilization of volatile storage during the execution of such programming instructions. In some implementations, processor 120 comprises at least a portion of memory 122, for example as on-board random access memory (RAM). It is further appreciated that memory 122 is an example of computer readable media that can store programming instructions executable on processor 120. Furthermore, memory 122 is also an example of a memory unit and/or memory module.

In particular, it is appreciated that memory 122 stores application 145, that, when processed by processor 120, enables processor 120 to: place indicator 135 in a given notification mode when first detector 137 detects that device 101 is mated with a carrying case and second detector 139 detects that the carrying case is in the open configuration. It is yet further appreciated that application 145 is an example of programming instructions stored at memory 122.

Processor 120 can be further configured to communicate with display 126, microphone 134 and speaker 132. Display 126 comprises any suitable one of, or combination of, CRT (cathode ray tube) and/or flat panel displays (e.g. LCDs (liquid crystal displays), plasma displays, OLED (organic light emitting diode) displays, electrophoretic displays, capacitive or resistive touch screens, and the like). Microphone 134 comprises a microphone for receiving sound data at device 101. Speaker 132 comprises a speaker for providing sound data, audible alerts, audible communications from remote communication devices, and the like, at device 101. Processor 120 can also control one or more of display 126 and speaker 132 to provide notifications. Indeed, in some implementations, display 126 and indicator 135 can be combined, as described below with reference to FIGS. 4 and 5. In these implementations, processor 120 places at least a portion of display 126 is placed in a given notification mode when first detector 137 detects that device 101 is mated with a carrying case and second detector 139 detects that the carrying case is in the open configuration.

Interface 124 (and/or another communications interface, not depicted) can be implemented as one or more radios and/or connectors and/or network adaptors, configured to wirelessly communicate with one or more communication networks (not depicted) and/or wireless communication networks and/or wired communication networks and/or wireless transceivers. It will be appreciated that, in these implementations, interface 124 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, Bluetooth™ links, NFC (near field communication) links, WiFi links, WiMax links, packet based links, the Internet, analog networks, the PSTN (public switched telephone network), access points, and the like, and/or a combination. When interface 124 is configured to communicate with one or more communication networks, interface 124 can comprise further protocol specific antennas there for (not depicted).

Housing 109 can comprise any housing, casing, and the like, enabled to be at least one of held and carried by a human hand. In general, housing 109 houses the components of device 101; however some components can be visible via apertures, windows and the like in housing 109. For example, display 126 is generally visible. In implementations where indicator 135 comprises a light, indicator 135 is also visible.

However, indicator 135 can comprise any suitable indictor, including but not limited to display 126, speaker 132, a light, an LED, and/or a vibratory device, such as a vibration motor.

Detector 137 is generally configured to detect when device 101 is mated with a carrying case, the carrying case having an open configuration and a closed configuration, wherein indicator 135 is hidden in the closed configuration and at least partially exposed in the open configuration. Detector 137 can hence comprise one or more of a proximity detector, a Hall detector (presuming that carrying case into which device 101 is to be inserted comprises a magnet), a camera device, an ambient light sensor and the like.

Detector 139 is generally configured to detect when a carrying case with which device 101 has been mated is in the open configuration. Detector 139 can hence comprise one or more of a proximity detector, a Hall detector (presuming that carrying case into which device 101 is to be inserted comprises a magnet), a camera device, an ambient light sensor, a thermal detector and the like.

It is yet further appreciated that both detectors 137, 139 are located so as to respectively detect when device 101 is mated with a carrying case and when the carrying case is in an open configuration and/or a closed configuration. For example, when detector 137 comprises a Hall detector, detector 137 is located at device 101 such that a complimentary magnet at a carrying case into which device 101 is to be inserted can be detected.

Similarly, when detector 139 comprises an ambient light sensor, and a carrying case into which device 101 is to be inserted comprises a flap that is open in the open configuration and closed in the closed configuration, detector 139 is located such that detector 139 is not obscured by the flap in the open configuration and obscured by the flap in the closed configuration.

While not depicted, it is yet further appreciated that device 101 comprises a battery and/or a power pack, or any other suitable power source.

In any event, it should be understood that a wide variety of configurations for device 101 are contemplated.

Figure 2:
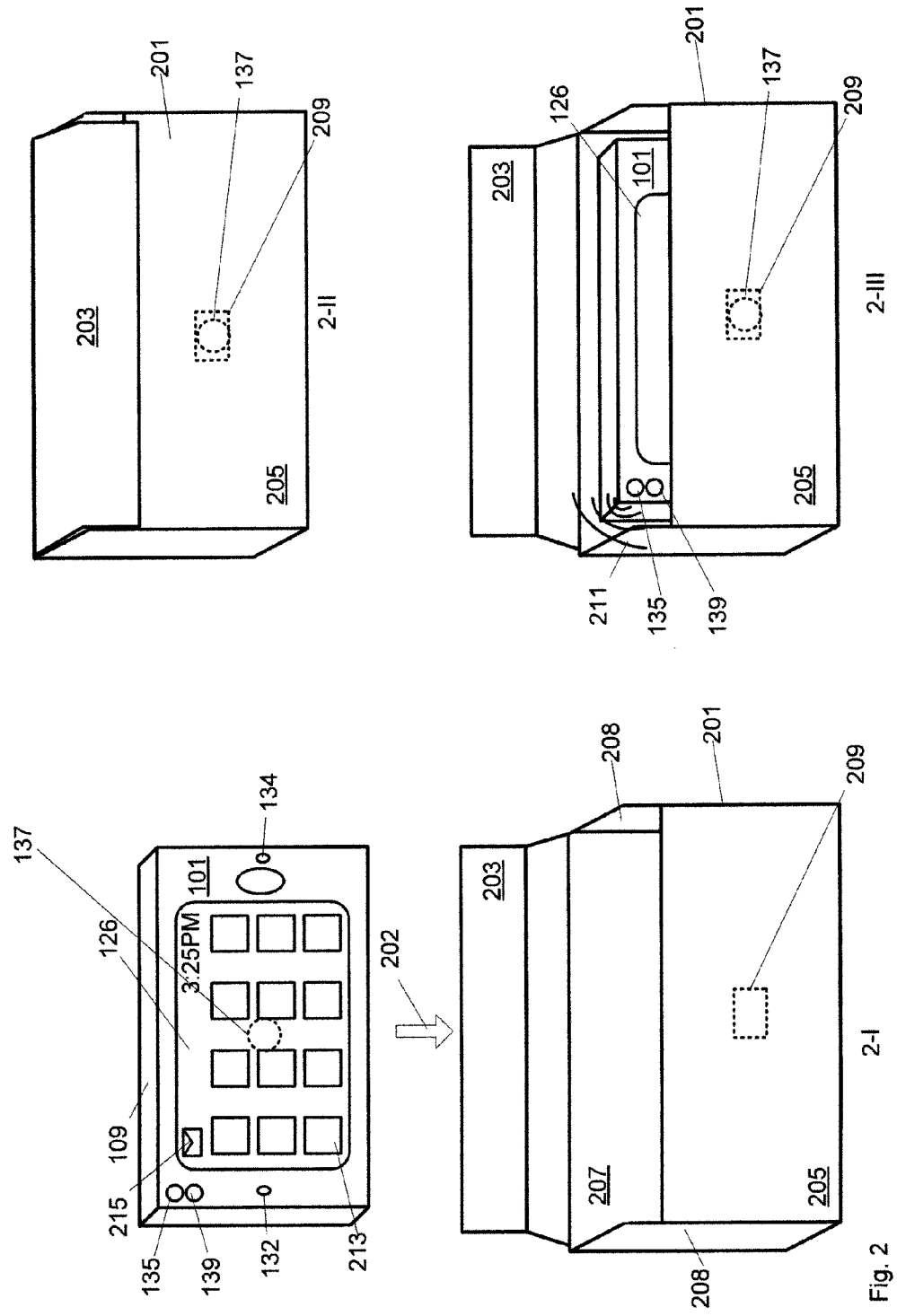
FIG. 2 depicts a sequence showing the device of FIG. 1 being mated with a carrying case and providing notifications when the carrying case is in an open configuration, according to non-limiting implementations.

Attention is next directed to FIG. 2, which depicts a sequence of views 2-I, 2-II, 2-III in which device 101 is received in a carrying case 201, carrying case 201 comprising a holster for device 101, according to non-limiting implementations. In view 2-I, device 101 is being mated with/being placed into carrying case 201 as indicated by arrow 202. In these implementations, indicator 135 comprises one or more of a light and an LED, detector 137 comprises a Hall detector and detector 139 comprises an ambient light sensor. Detector 137 is generally internal to device 101, and hence is depicted in stippled lines. In contrast, indicator 135 is visible via a window in housing 109, and detector 137 can detect ambient light via a similar window in housing 109.

Carrying case 201 comprises a flap 203 which can be open, as in views 2-I, 2-III, or closed, as in view 2-II, a front wall 205, an oppositely disposed back wall 207 and side walls 208 connecting front wall 205 and back wall 207, such that carrying case 201 can receive device 101 therein. It is further appreciated that, while not visible, carrying case 201 comprises a bottom wall. While each of front wall 205, back wall 207 and side walls 208 (as well as the bottom wall) are depicted as being joined to each other along an entirety of each joining edge, in other implementations, front wall 205, back wall 207 and side walls 208 (as well as the bottom wall) can be joined at only one or more portions of the joining edges. Further each of front wall 205, back wall 207 and side walls 208 (as well as the bottom wall) can comprise gaps, apertures and the like.

Carrying case 201 can comprise any suitable apparatus for carrying mobile device 101, including, but not limited to, a holster, a sleeve, a sheath, a wallet, a folder, a portfolio, bag and/or other receptacle. Further, carrying case 201 can comprise one or more of a soft case, a hard case, a combined hard and soft case, a binder, a folio, a folio case, a folio hardshell, a shell, a hardshell, a softshell, a cover, a soft case, a hard case and a stand.

Carrying case 201 Further comprises a magnet 209, or the like, which is generally internal to carrying case 201, and hence is depicted in stippled lines in view 2-I, for detection by detector 137. When detector 137 does not comprise a Hall detector, carrying case 201 can comprise an element for detection by detector 137 such that detector 137 can detect when device 101 is mated with carrying case 201.

In view 2-II, device 101 has been received in carrying case 201 and flap 203 has been closed over device 101 (which is hence not visible in view 2-II). In other words, in view 2-II, carrying case 201 is in a closed configuration with flap 203 closed and device 101, including indicator 135, is obscured by flap 203.

In view 2-III, flap 203 has been opened to expose a portion of device 101, including indicator 135. In other words, in view 2-III, carrying case 201 is in an open configuration with flap open.

View 2-I further depicts locations of indicator 135, detector 139 and detector 137 at device 101 in specific non-limiting example implementation. Indicator 135 is located such that indicator 135 is exposed in carrying case 201 when carrying case 201 is in the open configuration, as in view 2-III, and such that indicator 135 is obscured by carrying case 201 when carrying case 201 is in the open configuration, as in view 2-II. Specifically, in view 2-II, flap 203 obscures indicator 135 such that indicator 135 is not visible.

However, while indicator 135 is depicted as being located at a corner of device 101, indicator 135 could be located at any location on device 101 that is not obscured when device 101 is received in carrying case 201 and carrying case 201 is in an open configuration, including, but not limited to, along an edge and/or side of device 101.

Detector 137 is located such that detector 137 can detect magnet 209 of carrying case 201 when device 101 is received therein. Hence, detector 137 can detect when device 101 is mated with carrying case 201 when detector 137 detects magnet 209. For example, in views 2-I, 2-II, it is apparent that detector 137 and magnet 209 are generally aligned when device 101 is received in carrying case 201 so that detector 137 can detect magnet 209. However, while detector 137 is depicted as being located at about a center of device 101, detector 137 could be located at any location on device 101 for detecting magnet 209 and/or any other element for indicating that device 101 is mated with carrying case 201 including, but not limited to, off-centre and/or along an edge and/or side of device 101. By locating detector 137 at about center of device 101, however, detector 137 can detect magnet 209 regardless of an orientation of device 101 in carrying case 201, as magnet 209, as depicted, is located about center of carrying case 201. Another magnet can be located at a similar position at a rear of carrying case 201 such that detector 137 can detect the other magnet, when received facing the rear of carrying case 201; in these implementations, device 101 can detect when device 101 is mated with carrying case 201 regardless of whether device 101 is oriented frontwards or backwards in carrying case 201.

Detector 139 is located such that detector 139 can detect whether flap 203 is open or closed. In depicted implementations, detector 139 is located adjacent indicator 135; hence, when flap 203 is closed and obscures indicator 135, detector 139 is also obscured. Hence, detector 139 will detect a decrease in ambient light and/or ambient light being below a respective threshold level, hence leading to a detection of flap 203 being closed and/or carrying case 201 being in a closed configuration. Processor 120 hence places indicator 135 in one or more of a sleep mode and a carrying case mode when detector 137 detects that device 101 is mated with carrying case 201 and detector 139 detects that carrying case 201 is in the closed configuration. In other words, if indicator 135 is on when flap 203 is closed, processor 120 turns indicator 135 off in the sleep mode and/or carrying case mode, thereby saving power at device 101.

Similarly, when flap 203 is open, detector 139 will detect an increase in ambient light and/or ambient light being above a respective threshold level, hence leading to a detection of flap 203 being open and/or carrying case 201 being in an open configuration. In response, processor 120 will control indicator 135 to enter a given notification mode, such that, when notifications are pending, indicator 135 will provide a notification 211 of such including, but not limited to turning on, flashing, changing colour and the like. Specifically, processor 120 places indicator 135 in a given notification mode when detector 137 detects that device 101 is mated with carrying case 201 and detector 139 detects that carrying case 201 is in the open configuration.

Respective threshold levels for determining whether flap 203 is opened or closed can be the same or different. However, when the respective threshold levels are different, with a respective threshold level for determining whether flap 203 is closed is less than a respective threshold level for determining whether flap 203 is open.

Further, while detector 139 is depicted as being located adjacent indicator 135, detector 139 could be located at any location on device 101 for determining when carrying case 201 is in an open configuration, including, but not limited to, along an edge and/or side of device 101.

In depicted implementations, display 126 is turned off and/or placed in a sleep mode and/or a carrying case mode when device 101 is received in carrying case 201 (e.g. when detector 137 detects magnet 209) and display 126 is not turned on (and/or remains off and/or remains in a sleep mode and/or a carrying case mode) when detector 139 detects that flap 203 is open and/or that carrying case 201 is in an open configuration. For example, in view 2-I, display 126 is on, and icons 213 are being rendered along with a notification 215 of message and a time, for example in a status bar.

Alternatively, processor 120 can place display 126 in a given notification mode when first detector 137 detects that device 101 is mated with a carrying case and second detector 139 detects that the carrying case is in the open configuration. For example, one or more of notification 215 and a status bar can be provided in the given notification mode.

It is appreciated that, information depicted as being rendered at display 126 in FIG. 2 is an example only and indeed information rendered at display 126 can include, but is not limited to, application information, network information, and the like.

From FIG. 2 it is also apparent that present implementations include carrying cases in which at least a part of the carrying case can be folded or bent. While carrying case 201 is depicted as comprising a flap 203, other carrying cases in present implementations can comprises a cover, a foldable cover, and the like. In any event, a cover and/or a flap of carrying cases of present implementations can comprise a seam and/or can be pliable and/or otherwise bend-able; a user may fold or bend the cover and/or flap to get a peek at display 126, indicator 135 and/or other indicator.

Figure 3:
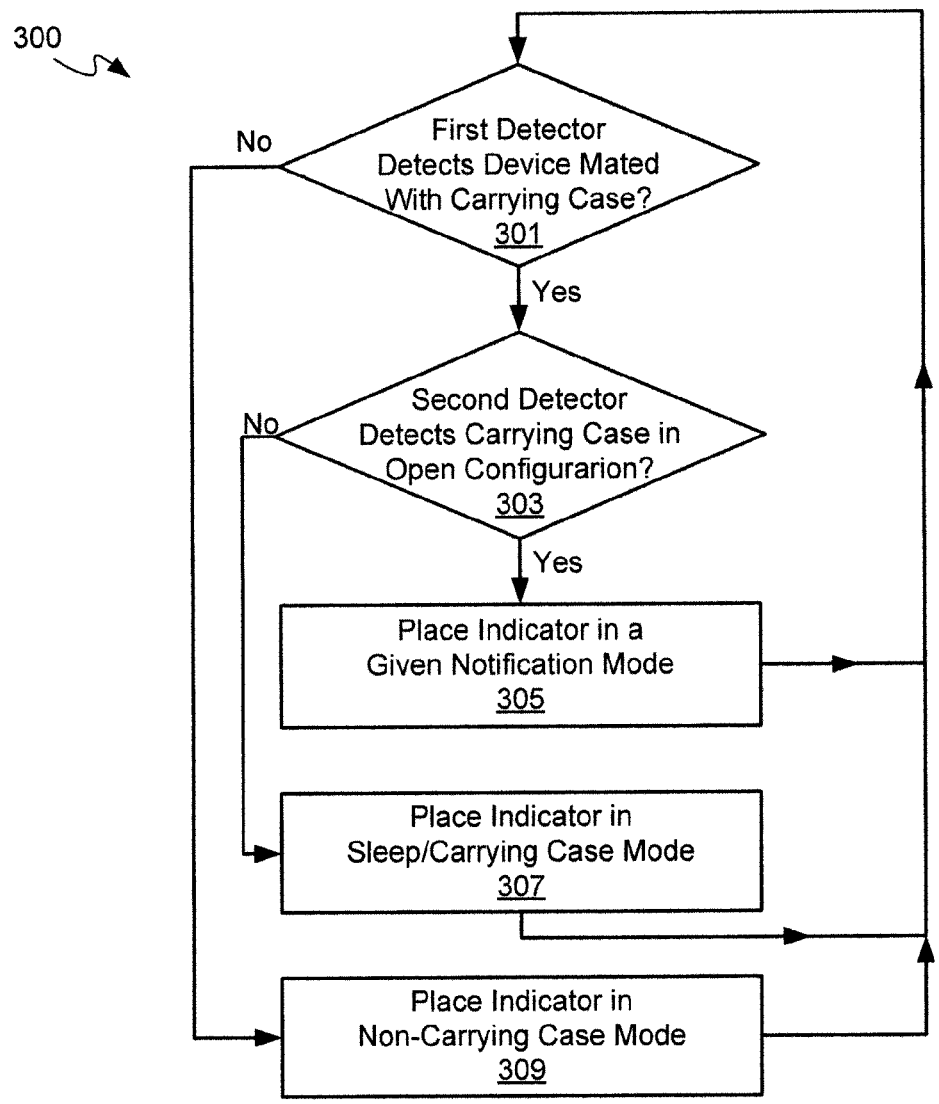
FIG. 3 depicts a flow chart of a method for providing notifications at the device of FIG. 1 when mated with a carrying case, according to non-limiting implementations.

Attention is now directed to FIG. 3 which depicts a flowchart illustrating a method 300 for providing notifications at a device, according to non-limiting implementations. In order to assist in the explanation of method 300, it will be assumed that method 300 is performed using device 101. Furthermore, the following discussion of method 300 will lead to a further understanding of device 101 and its various components. However, it is to be understood that device 101 and/or method 300 can be varied, and need not work exactly as discussed herein in conjunction with each other, and that such variations are within the scope of present implementations. It is appreciated that, in some implementations, method 300 is implemented in device 101 by processor 120.

It is to be emphasized, however, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood that method 300 can be implemented on variations of device 101 as well.

At block 301, processor 120 determines whether first detector 137 is detecting that device 101 is mated with carrying case 201; when processor 120 determines that first detector 137 is detecting that device 101 is mated with carrying case 201 (a "Yes" decision at block 301), at block 303, processor 120 determines whether second detector 139 is detecting that carrying case 201 is in an open configuration; when processor 120 determines that second detector 139 is detecting that carrying case 201 is in an open configuration (a "Yes" decision at block 303), at block 305, processor places indicator 135 and/or display 126 in a given notification mode.

However, at block 303, when processor 120 determines that second detector 139 is detecting that carrying case 201 is in a closed configuration (a "No" decision at block 303), at block 307, processor 120 places indicator 135 and/or display 126 in one or more of a sleep mode and a carrying case mode.

Returning to block 301, when processor 120 determines that first detector 137 is detecting that device 101 is not in carrying case 201 (a "No" decision at block 301), at block 309, processor 120 places indicator 135 and/or display 126 in a non-carrying case mode, which can be similar or different from the given notification mode of block 305. However, it is further appreciated that the non-carrying case mode can comprise a normal notification mode where notifications are provided at indictor 135 and/or display 126.

In general, method 300 can be repeated after any of blocks 305, 307, 309. Further blocks 301, 303 can be implemented in parallel. Further block 303 can be implemented prior to block 301, though it is appreciated that detector 137 detecting an open configuration (e.g. an increase in ambient light and/or detected ambient light being above a respective threshold level) of carrying case 201 while detector 139 is detecting that device 101 is not in carrying case 201 can cause processor 120 to implement block 309.

In other words, both a condition of detector 137 detecting carrying case 201 and a condition of detector 139 detecting an open configuration are met in order for processor 120 to place indicator 135 and/or display 126 in a given notification mode.

Figure 4:
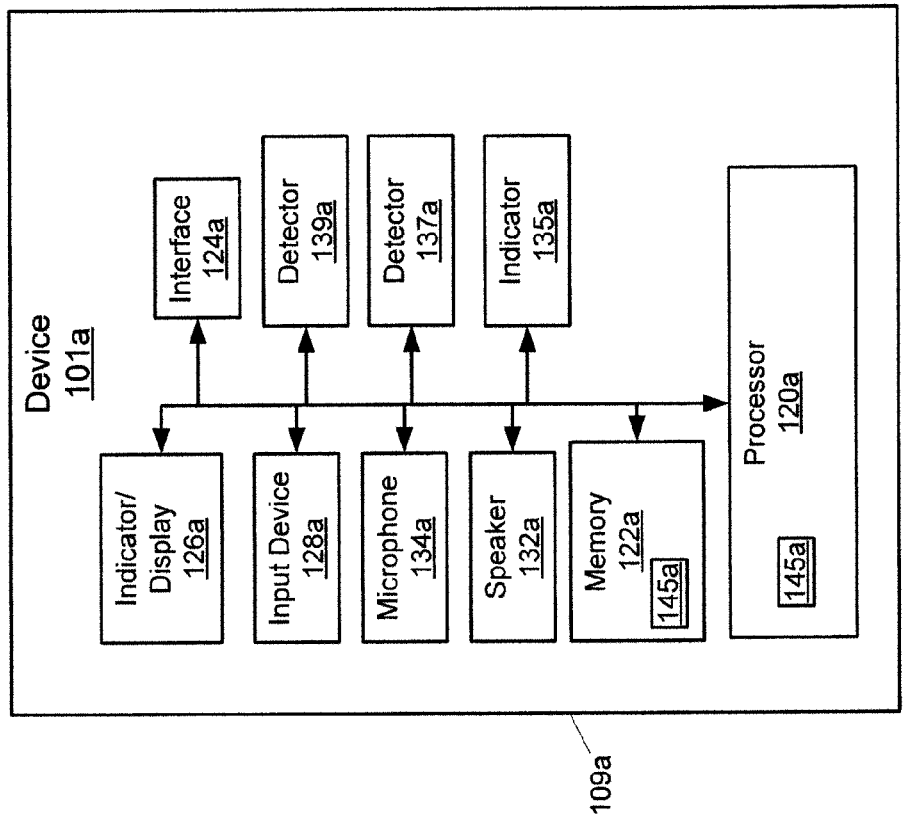
FIG. 4 depicts a block diagram of an alternative device for providing notifications when mated with a carrying case, according to non-limiting implementations.

Attention is next directed to FIG. 4, which is substantially similar to FIG. 1, with like elements having like numbers, however with an "a" appended thereto. FIG. 4 depicts a device 101a comprising a housing 109a, which houses a processor 120a interconnected with: a memory 122a; a communications interface 124a (interchangeably referred to as interface 124a); an indicator comprising a display 126a for providing notifications; an input device 128a; a speaker 132a; a microphone 134a; an indicator 135a; a first detector 137a configured to detect when device 101a is mated with a carrying case, the carrying case having an open configuration and a closed configuration, wherein indicator/display 126a is hidden in the closed configuration and at least partially exposed in the open configuration; and, a second detector 139a configured to detect when the carrying case is in the open configuration. Processor 120a is configured to place indicator/display 126a (referred to hereafter as display 126a) in a given notification mode when first detector 137a detects that device 101a is mated with the carrying case and second detector 139a detects that the carrying case is in the open configuration.

Memory 122a stores an application 145a, similar to application 145, however, application 145a enables processor 120a to: place display 126a in a given notification mode when first detector 137a detects that device 101a is mated with the carrying case and second detector 139a detects that the carrying case is in the open configuration, rather than indicator 135a.

Specifically, in these implementations, an indicator for notifications is combined with display 126a, and processor 120a is configured to control at least a portion of display 126a to turn on and/or provide notifications in the given notification mode, as described below with reference to FIG. 5.

Further, device 101a and/or display 126a can enter a given notification mode different from a normal notification mode when first detector 137a detects that device 101a is mated with a carrying case and second detector 139a detects that the carrying case is in the open configuration, as explained in further detail below. The given notification mode can include, but is not limited to: a customized notification mode, a peek notification mode, a temporary notification mode, a special notification mode, and the like. In other words, method 300 can also be implemented in device 101a.

Figure 5:
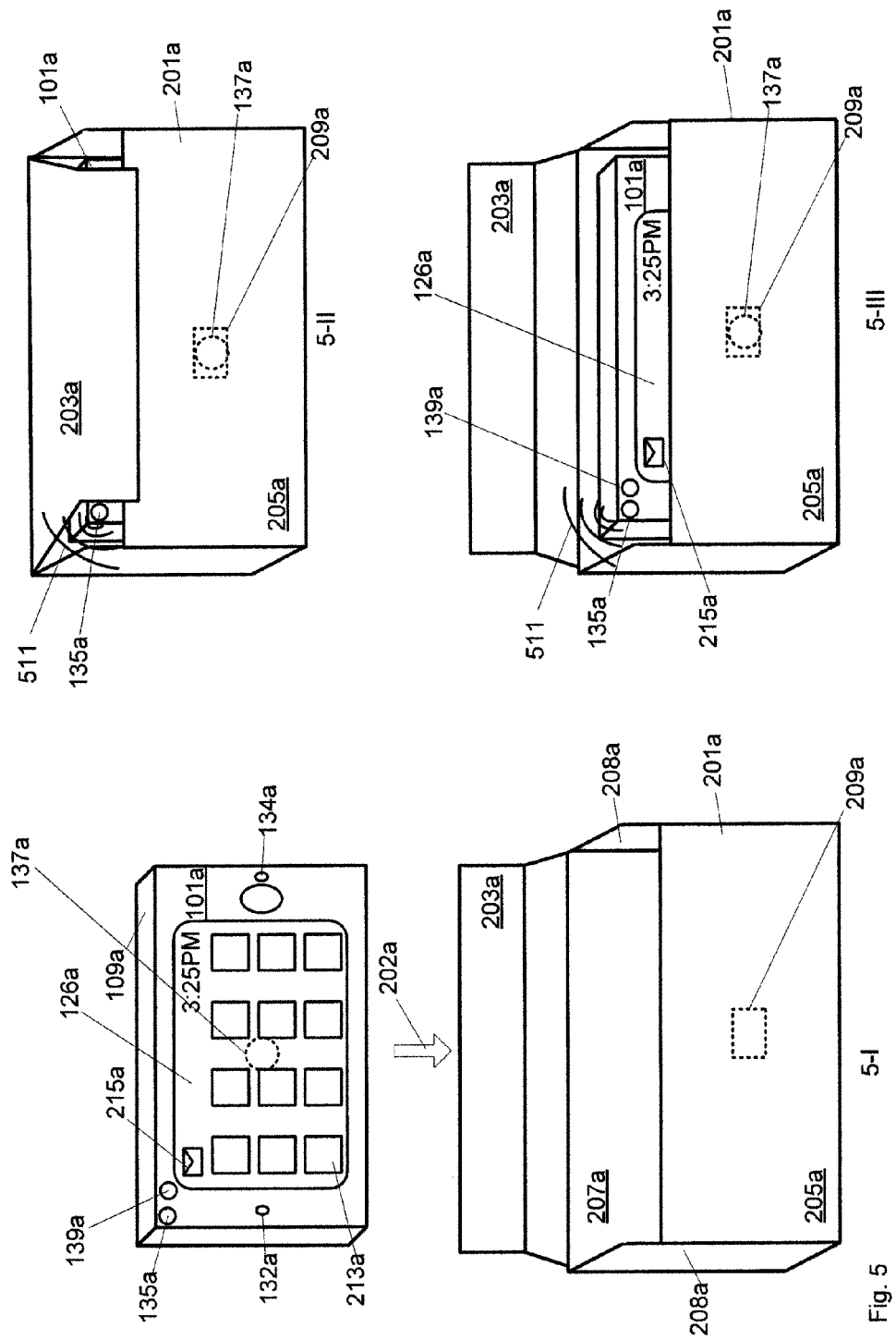
FIG. 5 depicts a sequence showing the device of FIG. 4 being mated with a carrying case and providing notifications when the carrying case is in an open configuration, according to non-limiting implementations.

Hence, attention is next directed to FIG. 5, which is substantially similar to FIG. 2, with like elements having like numbers, however with an "a" appended thereto. Specifically, FIG. 5 depicts a sequence of views 5-I, 5-II, 5-III in which device 101a is received in a carrying case 201a, carrying case 201a comprising a holster for device 101a, according to non-limiting implementations. In a view 5-I, device 101a is being placed into carrying case 201a as indicated by arrow 202a. As in FIG. 2, in these implementations, indicator 135a comprises one or more of a light and an LED, detector 137a comprises a Hall detector and detector 139a comprises an ambient light sensor.

Carrying case 201a is generally similar to carrying case 201 and comprises a flap 203a, a front wall 205a, an oppositely disposed back wall 207a and side walls 208a connecting front wall 205a and back wall 207a, such that carrying case 201a can receive device 101a therein. Further, carrying case 201a comprises a magnet 209a, or the like, which is generally internal to carrying case 201a, and which is generally aligned with detector 137a when device 101a is received therein.

In view 5-II, device 101a has been received in carrying case 201a and flap 203a has been closed over device 101. In other words, in view 5-II, carrying case 201a is in a closed configuration with flap 203a closed. However, in contrast to device 101 and carrying case 201, flap 203a does not obscure indicator 135a. Hence, indicator 135a can provide a notification 511 when notifications are pending at device 101a. Indeed, it is appreciated that indicator 135a can provide notification 511 while device 101a is mated with carrying case 201a, notification 511 being exposed when flap 203a is closed, for example visible to a user of device 101a and carrying case 201a. Further, display 126a can be turned off.

In view 5-III, flap 203a has been opened to expose a portion of device 101a, including at least a portion of display 126a. In other words, in view 5-III, carrying case 201a is in an open configuration with flap 203a open. For example, flap 203a can be opened by a user of device 101a and carrying case 201a in response to notification 511.

However, in contrast to view 2-III, in view 5-III processor 120a places display 126a in a given notification mode when first detector 137a detects that device 101a is mated with carrying case 201a and second detector 139a detects that carrying case 201a is in the open configuration. Specifically, processor 120a controls at least a portion of display 126a to turn on in the given notification mode.

In some implementations, processor 120a controls display 126a to turn on in the given notification mode. In other words, even though the entirety of display 126a is not visible when device 101a is mated with carrying case 201a, the entire area of display 126a can be turned on in the given notification mode; hence, even though the entirety of display 126a is not visible in view 5-III, display 126a can be rendering both icons 213a (not visible in view 5-III), notification 215a and time and/or a status bar.

Figure 6:
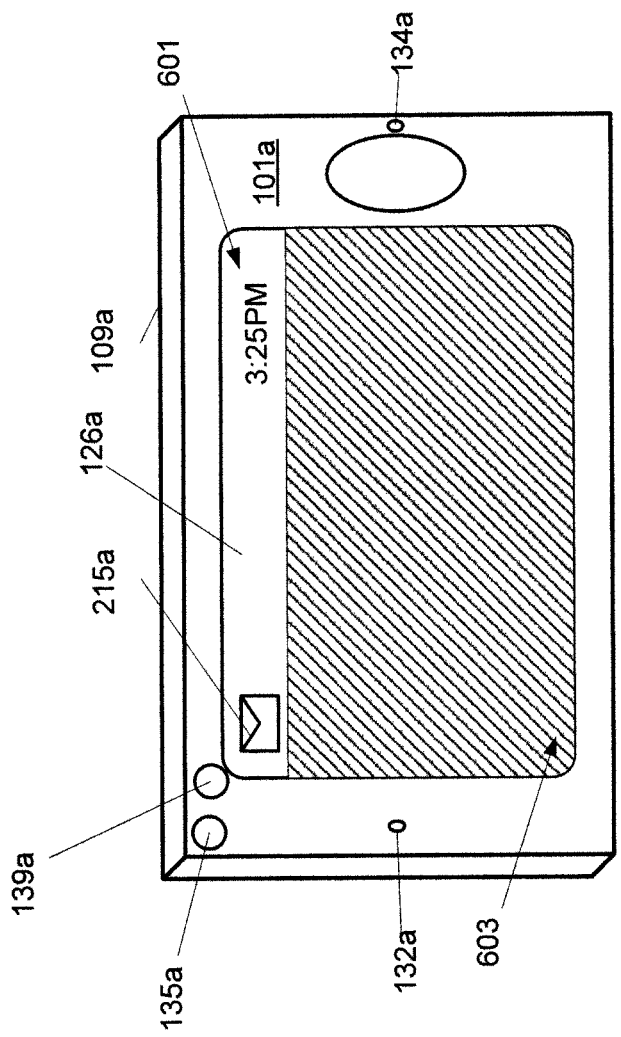
FIG. 6 depicts information provided at a display of the device of FIG. 4 when the device is mated with the carrying case of FIG. 5, and the carrying case is in an open configuration, according to non-limiting implementations.

However, in other implementations, processor 120a controls a portion of display 126a that is at least partially exposed in the open configuration to turn on in the given notification mode. For example, attention is directed to FIG. 6, which depicts device 101a in a given notification mode according to these implementations. Only a portion 601 is turned on, portion 601 comprising notification 215a and a time, and/or a status bar. A remaining portion 603 of display 126a is turned off. In other words, portion 601 is the portion of display 126a that is at least partially exposed when device 101a is mated with carrying case 201a and flap 203a is open, hence, only portion 601 is turned on, while remaining portion 603 remains off, thereby saving power at device 101a and further providing a "peek" at display 126a.

Hence, in these implementations, processor 120a is configured to control indicator 135a to provide notifications regardless of a configuration of carrying case 201a (i.e. indicator 135a provides notification 511 regardless of whether flap 203a is open or closed). Processor 120a is further configured to control portion 601 of display 126a that is at least partially exposed in the open configuration to turn on in the given notification mode.

In some alternative implementations, indicator 135a can turn on only when carrying case 201 is in an open configuration.

Figure 7:
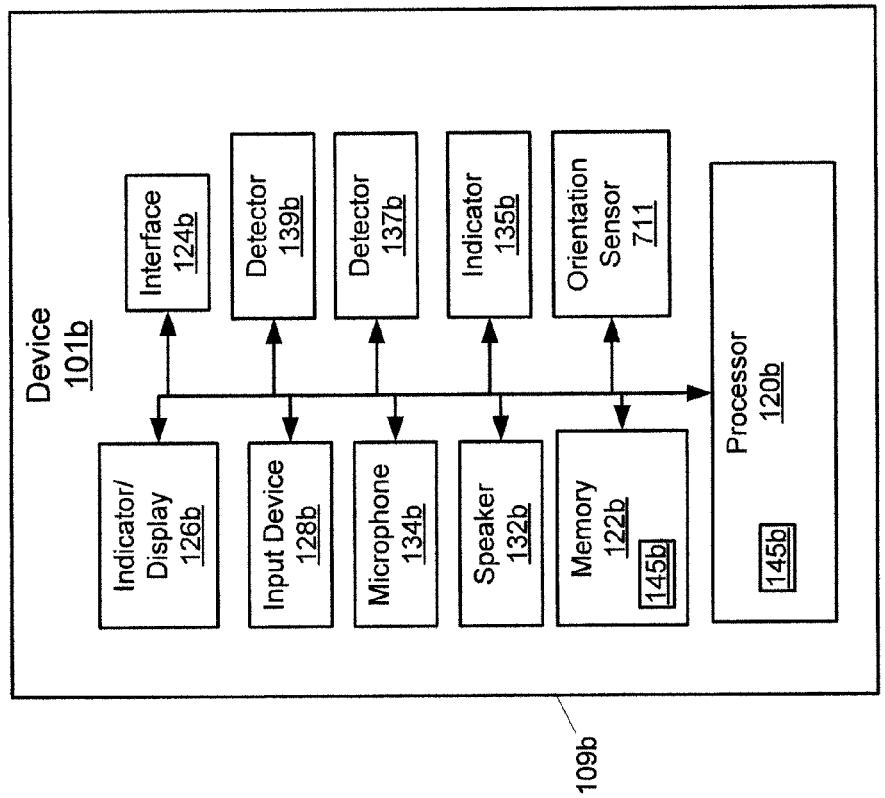
FIG. 7 depicts a block diagram of an alternative device for providing notifications when mated with a carrying case, according to non-limiting implementations.

Attention is next directed to FIG. 7, which is substantially similar to FIG. 4, with like elements having like numbers, however with a "b" appended thereto rather than an "a". FIG. 7 depicts a device 101b comprising a housing 109b, which houses a processor 120b interconnected with: a memory 122b; a communications interface 124b (interchangeably referred to as interface 124b); an indicator comprising a display 126b for providing notifications; an input device 128b; a speaker 132b; a microphone 134b; an indicator 135b; a first detector 137b configured to detect when device 101b is mated with a carrying case, the carrying case having an open configuration and a closed configuration, wherein indicator/display 126b is hidden in the closed configuration and at least partially exposed in the open configuration; and, a second detector 139b configured to detect when the carrying case is in the open configuration. Processor 120b is configured to place indicator/display 126b in a given notification mode when first detector 137b detects that device 101b is mated with the carrying case and second detector 139b detects that the carrying case is in the open configuration. Memory 122b stores an application 145b, similar to application 145a.

Further, device 101b and/or display 126b can enter a given notification mode different from a normal notification mode when first detector 137b detects that device 101b is mated with a carrying case and second detector 139b detects that the carrying case is in the open configuration, as explained in further detail below. The given notification mode can include, but is not limited to a customized notification mode, a peek notification mode, a temporary notification mode, a special notification mode, and the like. In other words, method 300 can also be implemented in device 101b.

However, in these implementations device 101b further comprises an orientation sensor 711 for detecting an orientation of device 101b. Orientation sensor 711 can comprise one or more of an accelerometer, a magnetometer and the like. In particular, orientations sensor 711 can detect whether device 101b is in a landscape orientation (e.g. a long axis of device 101b and/or display 126b being generally parallel with the ground) or a portrait orientation (e.g. a long axis of device 101b and/or display 126b being generally perpendicular with the ground). In these implementations, processor 120b is further configured to provide notifications in a portion of display 126b that is at least partially exposed in the open configuration based on the orientation of device 101b.

Figure 8B:
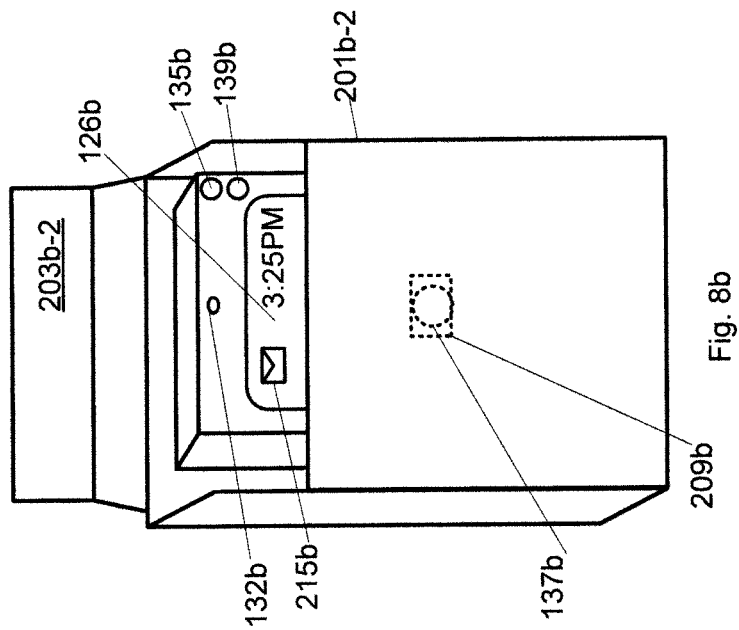
FIG. 8b depicts the device of FIG. 7 mated with a second carrying case in a second orientation, according to non-limiting implementations.
Figure 8A:
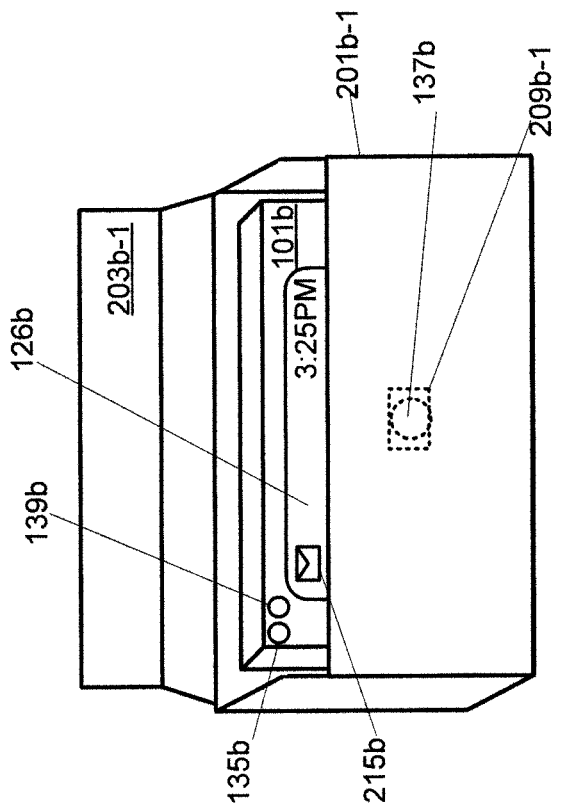
FIG. 8a depicts the device of FIG. 7 mated with a first carrying case in a first orientation.

For example, attention is next directed to FIG. 8a, which depicts device 101b in a carrying case 201b-1 that is similar to carrying case 201a, comprising a flap 203b-1 and a magnet 209b-1 respectively similar to flap 203a and magnet 209a. It is appreciated that carrying case 201b-1 further comprises a front wall, an opposing back wall, side walls and a bottom wall. It is appreciated that in FIG. 8a, carrying case 201b-1 is in an open configuration as flap 203b-1 is open, exposing at least a portion of display 126b. As in view 5-III, processor 120b controls at least a portion of display 126b that is at least partially exposed in the open configuration to turn on in the given notification mode to render notification 215b, similar to notification 215a, and a time, and/or a status bar.

It is appreciated that orientation sensor 711, while not depicted, detects that device 101a is a landscape orientation with a right side of device 101b being upwards, and hence, processor 120b controls display 126b to provide notification 215b and time in a landscape orientation along the edge of display 126b that is upmost.

In contrast, FIG. 8b depicts device 101b in another carrying case 201b-2 that is similar to carrying case 201a, comprising a flap 203b-2 and a magnet 209b-2 respectively similar to flap 203a and magnet 209a. It is appreciated that carrying case 201b-2 further comprises a front wall, an opposing back wall, side walls and a bottom wall. However, carrying case 201b-2 is configured to receive device 101b in a portrait orientation.

It is appreciated that in FIG. 8b, carrying case 201b-2 is in an open configuration as flap 203b-2 is open, exposing at least a portion of display 126b; however, the portion of display 126b exposed when device 101b is mated with carrying case 201b-2 is different from carrying case 201b-2, as carrying case 201b-2 receives device 101b in a portrait orientation. Nonetheless, processor 120b controls at least a portion of display 126b that is at least partially exposed in the open configuration to turn on in the given notification mode to render notification 215b, similar to notification 215a, and a time, and/or a status bar.

It is appreciated that orientation sensor 711, while not depicted, detects that device 101b is a portrait orientation with a top side of device 101b being upwards, and hence, processor 120b controls display 126b to provide notification 215b and time in a portrait orientation along the edge of display 126b that is upmost.

An issue, however, with using an orientation sensor to determine which portion of display 126b to place in a given notification mode, is that if carrying case 201b-1 was reoriented from a landscape orientation to a portrait orientation, with device 101b therein, processor 120b could control display 126b to place a portion of display 126b into a given notification mode that is not visible when carrying case 201b-1 is in an open configuration. Hence, for example, the portion of display 126b that is in the given notification mode in FIG. 8b could be turned on while device 101b is mated with carrying case 201b-1, and notification 215b may not be visible.

Figure 9:
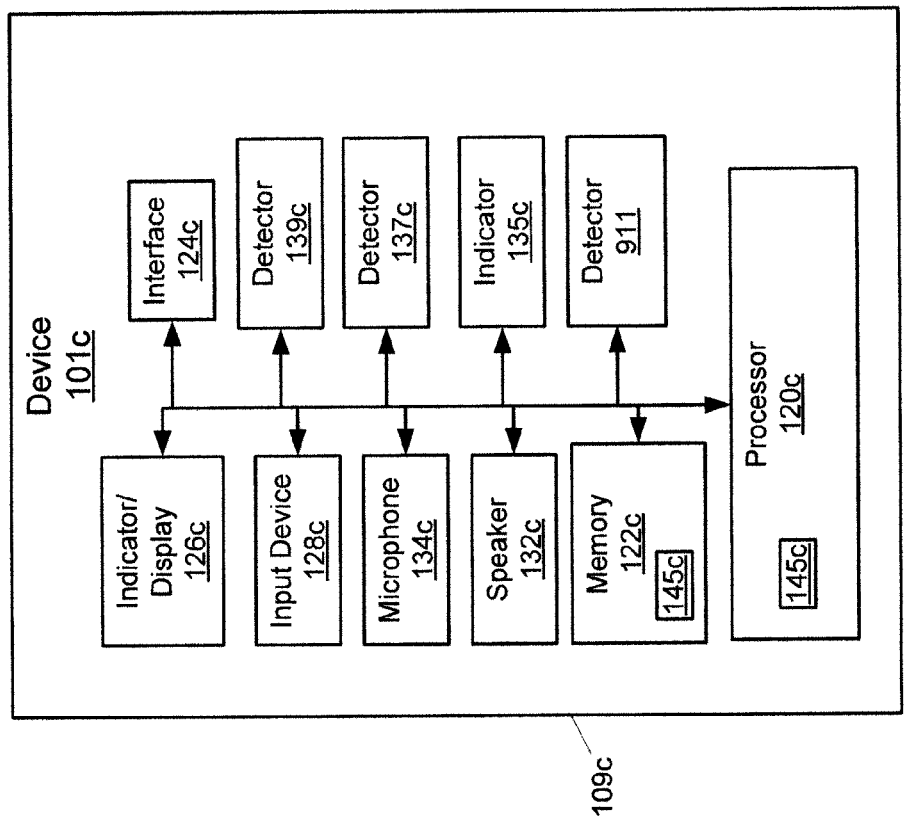
FIG. 9 depicts a block diagram of an alternative device for providing notifications when mated with a carrying case, according to non-limiting implementations.

Hence, attention is next directed to FIG. 9, which is substantially similar to FIG. 4, with like elements having like numbers, however with a "c" appended thereto rather than an "a". FIG. 9 depicts a device 101c comprising a housing 109c, which houses a processor 120c interconnected with: a memory 122c; a communications interface 124c (interchangeably referred to as interface 124c); an indicator comprising a display 126c for providing notifications; an input device 128c; a speaker 132c; a microphone 134c; an indicator 135c; a first detector 137c configured to detect when device 101c is mated with a carrying case, the carrying case having an open configuration and a closed configuration, wherein indicator/display 126c is hidden in the closed configuration and at least partially exposed in the open configuration; and, a second detector 139c configured to detect when the carrying case is in the open configuration. Processor 120c is configured to place indicator/display 126c in a given notification mode when first detector 137c detects that device 101c is mated with the carrying case and second detector 139c detects that the carrying case is in the open configuration. Memory 122c stores an application 145c, similar to application 145a.

Further, device 101c and/or display 126c can enter a given notification mode different from a normal notification mode when first detector 137c detects that device 101c is mated with a carrying case and second detector 139c detects that the carrying case is in the open configuration, as explained in further detail below. The given notification mode can include, but is not limited to: a customized notification mode, a peek notification mode, a temporary notification mode, a special notification mode, and the like. In other words, method 300 can also be implemented in device 101c.

However, in these implementations device 101c further comprises a detector 911 configured to detect a type of carrying case with which device 101c is mated. In general detector 911 is configured to detect a type of carrying case with which device 1010 is mated by detecting a corresponding element at the carrying case. For example, detector 911 can comprise one or more of an optical detector, a near field communication (NFC) detector, a radio frequency identification (RFID) detector, and the like; hence, a carrying case with which device 101c is to be mated can comprise one or more of an optical identifier and/or tag, an NFC tag, and RFID tag and the like, detectable by detector 911 (e.g. respectively detectable by the optical detector, the NFC detector, and the RFID detector). Processor 120 can be configured to control at least a portion of indicator/display 126c that is at least partially exposed in the open configuration to turn on in the given notification mode, based on the type of the carrying case.

For example, attention is next directed to FIG. 10a, which depicts device 101c in a carrying case 201c-1 that is similar to carrying case 201a, comprising a flap 203c-1 and a magnet 209c-1 respectively similar to flap 203a and magnet 209a. It is appreciated that carrying case 201c-1 further comprises a front wall, an opposing back wall, side walls and a bottom wall. It is appreciated that in FIG. 10a, carrying case 201c-1 is in an open configuration as flap 203c-1 is open, exposing at least a portion of display 126c.

As in view 5-III, processor 120c controls at least a portion of display 126c that is at least partially exposed in the open configuration to turn on in the given notification mode to render notification 215c, similar to notification 215a, and a time, and/or a status bar. It is appreciated, however, that carrying case 201c-1 further comprises an element 1011-1 that is detectable by detector 911, each of which are respectively located at carrying case 201c-1 and device 101c such that they are generally aligned when device 101c is mated with carrying case 201c-1.

In general element 1011-1 stores data and/or has data encoded therein and/or has data encoded thereon, identifying at least a type of carrying case 201c-1, the data detectable by detector 911. For example, when detector 911 comprises an NFC detector, element 1011-1 comprises an NFC tag storing data comprising one or more of a type of carrying case 201c-2 and an identifier of carrying case 201c-1 such the data can be retrieved at device 101c by detector 911. Similarly, when detector 911 comprises an RFID detector, element 1011-1 comprises an RFID tag storing data comprising one or more of a type of carrying case 201c-2 and an identifier of carrying case 201c-1 such the data can be retrieved at device 101c by detector 911. Similarly, when detector 911 comprises an optical detector, element 1011-1 comprises an optical identifier/tag onto which can be printed data comprising one or more of a type of carrying case 201c-2 and an identifier of carrying case 201c-1 such the data can be retrieved at device 101c by detector 911.

From the data received from element 1011-1, processor 120c can determine that carrying case 201c-1 mates with device 101c in a landscape orientation and further determine a portion of display 126c that is exposed when carrying case 201c-1 is in an open configuration. Display 126c can be controlled accordingly.

For example, memory 122c can store information relating carrying case types to a portion of display 126c that is to be controlled when device 101c is mated with a carrying case of given types.

Hence, when device 101c receives data from element 1011-1, processor 120c can determine that, in the given notification mode, notifications are to be provided in a landscape orientation at a top portion of display 126c. Processor 120c can further determine from data received from element 1011-1 what portion of display 126c to control to provide notifications and optionally what portion of display 126c that is to remain off in a given notification mode. In other words, processor 120c can further determine what portion of display 126c is at least partially exposed when device 101c is mated with carrying case 201c-1.

Similarly, FIG. 10b depicts device 101c mated with another carrying case 201c-2 that is similar to carrying case 201a, comprising a flap 203c-2 and a magnet 209c-2 respectively similar to flap 203a and magnet 209a. It is appreciated that carrying case 201c-2 further comprises a front wall, an opposing back wall, side walls and a bottom wall. However, carrying case 201c-2 is configured to mate with device 101c in a portrait orientation. Carrying case 201c-2 comprises an element 1011-2, similar to element 1011-1, however element 1011-2 comprises data indicating a type of carrying case 201c-2. Hence, when device 101c receives data from element 1011-2 via detector 911, processor 120c can determine that, in a given notification mode, notifications are to be provided in a portrait orientation at a top portion of display 126c. Further, processor 120c can further determine what portion of display 126c is at least partially exposed when device 101c is mated with carrying case 201c-2 and provide notifications in the portion of display 126c that is at least partially exposed.

Attention is next directed to FIG. 11 which depicts a view 11-I of device 101c mated with a carrying case 201d in a closed configuration, and a view 11-II of device 101c mated with carrying case 201d in an open configuration.

Carrying case 201d comprises one or more of a holder, a holster and the like, with an open top for inserting and removing device 101c, and an element 1111 similar to elements 1011-1, 1011-2. Carrying case 201d further comprises a sliding portion 1113 at a front wall 205d of carrying case 201d, sliding portion 1113 configured to slide along front wall 205d to an open configuration, as depicted in view 11-II, thereby exposing at least a portion of display 126c of device 101c. In depicted implementations, sliding portion 1113 slides in a direction of arrow 1115 (e.g. down, as depicted) to expose at least a portion of display 126c. In general sliding portion 1113 slides between the closed configuration of view 11-I and the open configuration of view 11-II.

In some implementations sliding portion 1113 can be biased towards the closed configuration. While not depicted, it is further appreciated that carrying case 201d comprises apparatus for enabling sliding portion 1113 to slide between the closed configuration and the open configuration, and optionally for biasing sliding portion 1113 towards the closed position.

In any event, comparing FIG. 11 with FIGS. 10a, 10b, it is appreciated that, as depicted, a larger portion of display 126c is exposed in the open configuration of carrying case 201d than in the open configuration of carrying cases 201c-1, 201c-2. Hence, processor 120c can control a larger portion of display 126c to provide notifications when device 101c is mated with carrying case 201d as compared to when device 101d is mated with carrying cases 201c-1, 201c-2.

For example, as depicted in view 11-II, processor 120c controls display 126c to provide additional information associated with notifications in the exposed portion of display 126c, for example, "New Email From Sue". It is appreciated that processor 120c controls display 126c based on data received from element 1111. It is further appreciated that a type of data displayed can be configured at application 145c and based on an amount of display 126c that is exposed in a given carrying case.

Persons skilled in the art will appreciate that there are yet more alternative implementations and modifications possible. It is appreciated that heretofore it has been assumed that each of devices 101, 101a, 101b, 101c, is mated with a respective carrying case in a particular orientation relative to the respective carrying case. For example, returning to FIG. 2, device 101 is mated with carrying case 201 with indicator 135 adjacent flap and display 126 facing front wall 205 in a landscape orientation. However, when device 101 is mated with carrying case 201 in a different orientation, for example, device 101 facing back wall 207, and/or device 101 inserted into carrying case 201 upside down, depending on locations and/or orientations of detectors 137, 139, magnet 209 etc., processor 120 may detect that device 101 is mated with carrying case 201 and may further detect that flap 203 is open. In these situations, indicator 135 would be controlled to provide notifications even though indicator 135 may not be visible. Similar situations can occur with each of devices 101, 101a, 101b, 101c.

To mitigate such false positives, one or more of devices 101, 101a, 101b, 101c can further comprise a detector for determining an orientation of a device relative to a mated carrying case and provide notifications only when the orientation of the device is such that at least a portion of the indicator is exposed when the mated carrying case is in an open configuration. Such detectors can include any suitable combination of ambient light sensors, cameras, orientation sensors, NFC detectors, RFID detectors, optical sensors and the like. In some of these implementations, a respective mated carrying case can comprise elements for detection to assist a device in determining a relative orientation when mated with the respective carrying case.

Alternatively, the orientation of a device relative to a mated carrying case can be used by a respective processor to determine a portion of a respective display that is to be placed in a given notification mode. For example, attention is again directed to view 11-II; it is presently further assumed that processor 120c can determine: when device 101c is mated with carrying case 201d; and when carrying case 201d is in an open configuration, regardless of an orientation of device 101c in carrying case 201d. It is further presumed that device 101c further comprises one or more detectors for detecting a relative orientation of device 101c in carrying case 201d.

In any event, in these implementations, when display 126c is facing a back wall of carrying case 201d and is not exposed regardless of a configuration of carrying case 201d, processor 120c leaves display 126c in one or more of a sleep mode and a carrying case mode, for example, turning display 126c off. However, when display 126c is upside down, relative to the orientation of device 101c in view 11-II, but at least a portion of display 126c is exposed (i.e. display 126c is facing front wall 205d), processor 120c places the exposed portion of display 126c in a given notification mode.

Figure 12:
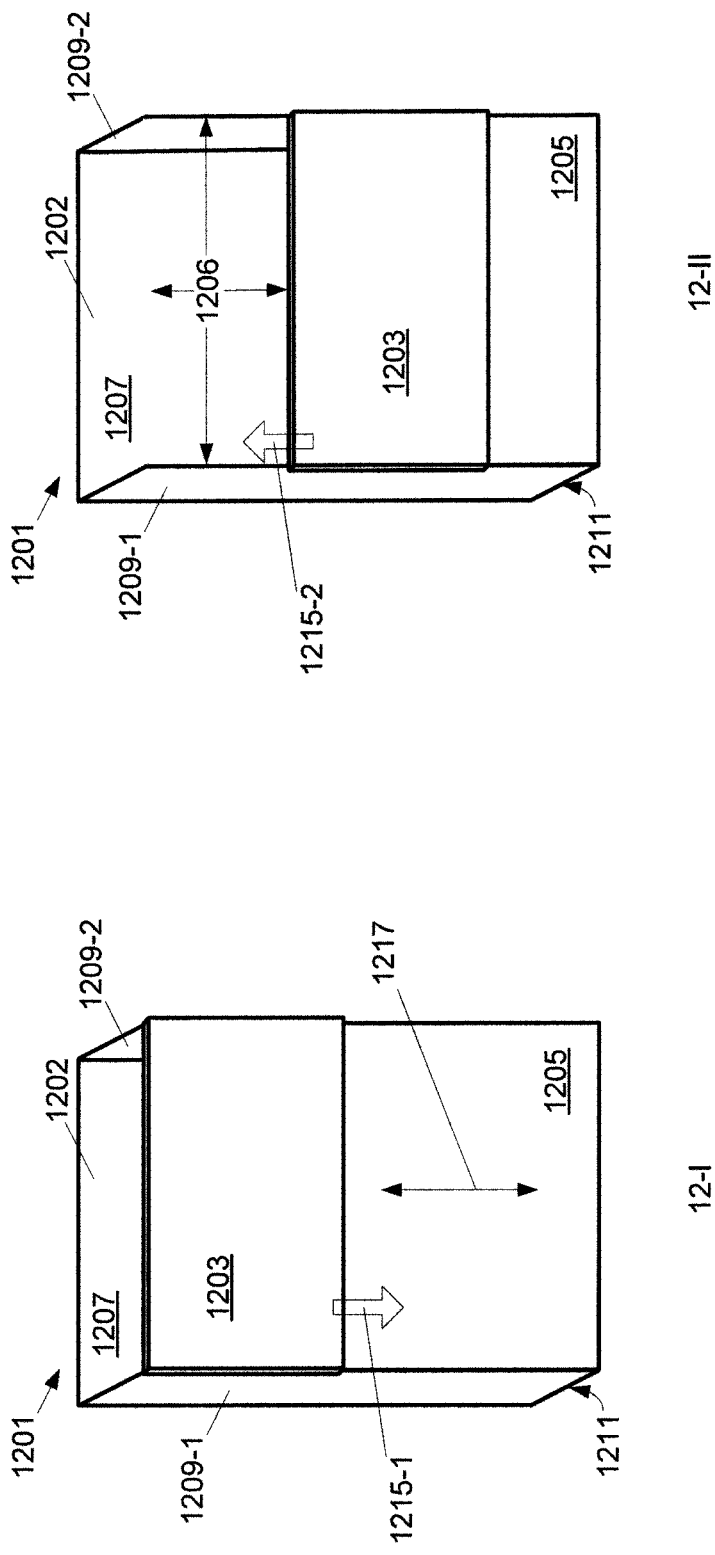
FIG. 12 depicts a carrying case comprising a sliding portion in a closed position and an open position, according to non-limiting implementations.

Attention is next directed to FIG. 12 which depicts views 12-I, 12-II of a carrying case 1201, similar to carrying case 201d in, respectively, a closed configuration and an open configuration, according to non-limiting implementations. Carrying case 1201 comprises: a device holding portion 1202 configured to receive a mobile device (not depicted, but similar to devices 101, 101a, 101b, 101c), device holding portion 1202 comprising at least a front wall 1205 and a gap 1206 in front wall 1205 for exposing an indicator of the mobile device, for example as in FIG. 11. Carrying case 1201 further comprises a sliding portion 1203 configured to move between a closed position and an open position, sliding portion 1203 obscuring gap 1206 in the closed position and exposing at least a portion of gap 1206 in the open position, sliding portion 1203 being about planar. Sliding portion 1203 is in the closed position in view 12-I and in the open position in view 12-II.

Device holding portion 1202 generally comprises front wall 1205 and gap 1206 therein as well as an opposing back wall 1207, side walls 1209-1, 1209-2 joining front wall 1205 to back wall 1207, and a bottom wall 1211 such that carrying case 1201 can receive a mobile device therein. Side walls 1209-1, 1209-2 will be interchangeably referred to hereafter, collectively, as side walls 1209 and generically as a side wall 1209. While each of front wall 1205, back wall 1207, side walls 1209 and bottom wall 1211 are depicted as being joined to each other along an entirety of each joining edge, in other implementations, front wall 1205, back wall 1207, side walls 1209, and bottom wall 1211 can be joined at only one or more portions of the joining edges. Further each of front wall 1205, back wall 1207, side walls 1209 and bottom wall 1211 can comprise gaps, apertures and the like, other than gap 1206.

In depicted implementations, gap 1206 comprises a cut-out of front wall 1205, however, in other implementations, gap 1206 can comprise one or more of an aperture in front wall 1205 (for example see FIG. 17 described below), a cut-out of front wall 1205, a window in front wall 1205, and an opening in front wall 1205.

Regardless of whether gap 1206 comprises an aperture, a cut-out, a window or the like, it is appreciated that one or more of walls 1205, 1209 form edges of gap 1206, and alternatively carrying case 1206 can comprise arms, edges, extensions and the like from one or more of walls 1205, 1209 configured to form gap 1206. Indeed, it is appreciated that device holding portion 1202 can form gap 1206, and that gap 1206 can comprise one or more of an opening, an aperture, a cut-out, a window and the like.

Further, carrying case 1201 can comprise one or more of a soft case, a hard case, a combined hard and soft case, a binder, a folio, a folio case, a folio hardshell, a shell, a hardshell, a softshell, a cover, a soft case, a hard case and a stand. Carrying case 1201 can further be manufactured from any combination of plastic, polycarbonate, metal, leather, and the like.

In any event, sliding portion 1203 is generally enabled to move between the closed position, as in view 12-I, and the open position, as in view 12-II. For example, arrow 1215-1 in view 12-I indicates that sliding portion 1203 is moveable to the open position from the closed position, and arrow 1215-2 in view 12-II indicates that sliding portion 1203 is moveable to the closed position from the open position.

From at least view 12-I, it is apparent that device holding portion 1202 comprises a longitudinal axis 1217 (i.e. carrying case 1201 in general, and device holding portion 1202 in particular, has a length, and a width that is less than the length).

Further, in depicted implementations, device holding portion 1202 is configured to receive a mobile device along longitudinal axis 1217. In other words, device holding portion 1202 is at least partially open at an end opposite bottom wall 1211 such that a mobile device can be received therein.

From views 12-I, 12-II, it is yet further appreciated that, in depicted implementations, sliding portion 1203 is configured to move between the closed position and the open position along longitudinal axis 1217.

From FIG. 12, it is apparent that sliding portion 1203 is about planar and that sliding portion 1203 generally retains its shape as sliding portion 1203 moves between the closed position and the open position. For example, while sliding portion 1203 can be bendable, such bending does not generally contribute to the movement between the closed position and the open position.

In implementations depicted in FIG. 12, front wall 1205 and sliding portion 1203 are configured such that sliding portion 1203 slides along an exterior side of front wall 1205 between the closed position and the open position. In other implementations, however, front wall 1205 and sliding portion 1203 are configured such that sliding portion 1203 slides along an interior side of front wall 1205 between the closed position and the open position: in these implementations, sliding portion 1203 will slide between front wall 1205 and a mobile device received at device holding portion 1202. In yet further implementations, front wall 1205 and sliding portion 1203 are configured such that sliding portion 1203 slides into front wall 1205 in the closed position; in these implementations, front wall 1205 can comprise a receptacle for receiving sliding portion 1203.

Regardless of the specific configuration of front wall 1205 and sliding portion 1203, it is appreciated that sliding portion 1203 is generally configured to be operated with one hand. In other words, carrying case 1201 may be generally configured to be handheld, that is, sized and shaped to be held and carried in a human hand, and used while held or carried. Furthermore, sliding portion 1203 is generally configured to move between the closed position and the open position when actuated by a finger and/or a thumb of a hand holding carrying case 1201. For example, a user holding carrying case 1201 can use their thumb, or the like, to apply sliding pressure to sliding portion 1203 to move sliding portion 1203 between the closed position and the open position.

In some implementations, sliding portion 1203 can be biased towards the closed position. In other words, when a user applies sliding pressure to sliding portion 1203 to move sliding portion 1203 to the open position, once the sliding pressure is released, sliding portion 1203 moves back to the closed position.

In yet further implementations, sliding portion 1203 can be biased towards both the closed position and the open position such that when sliding portion 1203 is displaced from either of the closed position and the open position, sliding portion 1203 moves to one of the closed position and the open position depending on a position of sliding portion 1203 relative to device holding portion 1202. For example, in some of these implementations, when sliding portion 1203 is displaced from the closed position more than halfway towards the open position and released, then sliding portion 1203 will move to the open position. Similarly, in these implementations, when sliding portion 1203 is displaced from the open position more than halfway towards the closed position and released, then sliding portion 1203 will move to the closed position. In this manner, sliding portion 1203 can be "snapped" to one or the other of the closed position and the open position.

Figure 13:
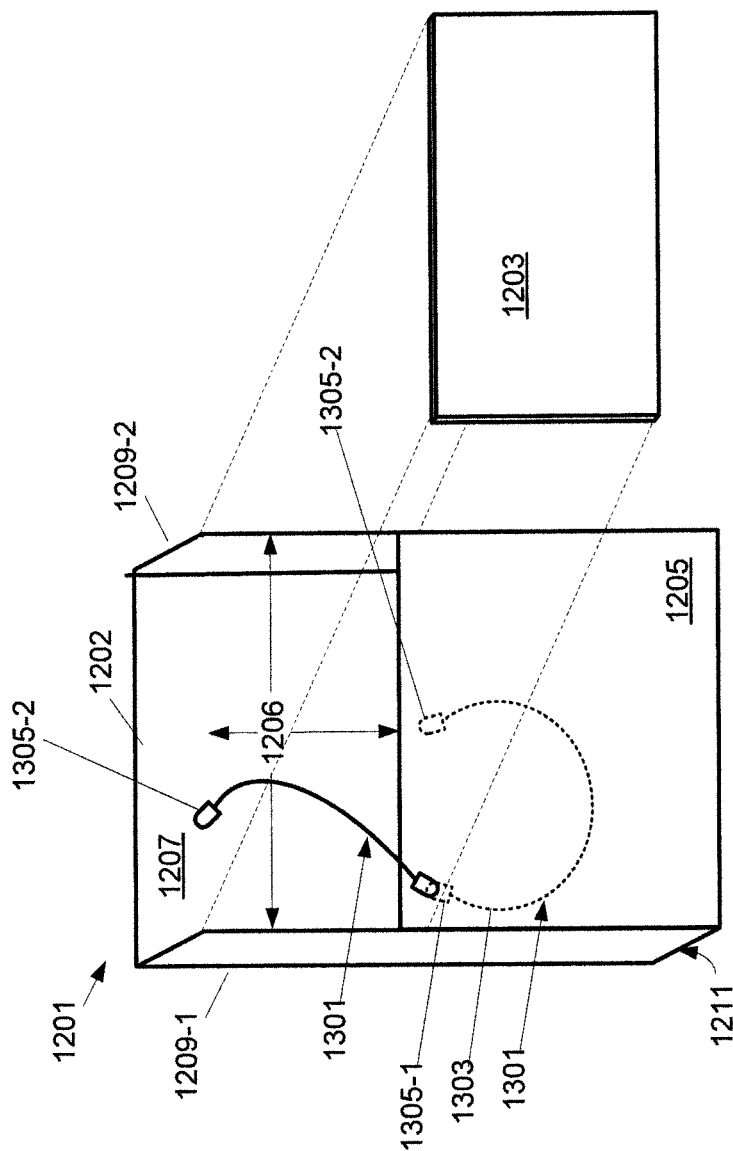
FIG. 13 depicts an exploded schematic view of the carrying case of FIG. 13 to show a biasing mechanism, according to non-limiting implementations.

Hence, carrying case 1201 can further comprise a biasing mechanism 1301, as depicted in FIG. 13, which depicts an exploded schematic view of carrying case 1201, but is otherwise similar to view 12-I with like elements having like numbers. As depicted, carrying case 1201 comprises biasing mechanism 1301 that includes a leaf spring 1303 and attachment portions 1305-1, 1305-2 respectively located at opposite ends of leaf spring 1303, attachment portions 1305-1, 1305-2 for respectively attaching a first end of leaf spring 1303 to front wall 1205 and an opposite end of leaf spring 1303 to sliding portion 1203. Attachment portions 1305-1, 1305-2 can be configured to pivot as sliding portion 1203 moves between the closed position and the open position.

In any event, biasing mechanism 1301 is depicted in two positions in FIG. 13: a first position depicted in solid lines and a second position depicted in broken lines. The first position of biasing mechanism 1301 corresponds to the closed position of sliding portion 1203 in view 12-I, while the second position of biasing mechanism 1301 corresponds to the open position of sliding portion 1203 in view 12-II.

Biasing mechanism 1301 can be generally configured to bias sliding portion 1203 to at least the closed position, depicted in view 12-I. However, as described above, biasing mechanism 1301 can be configured to bias sliding portion 1203 to both the closed position depicted in view 12-I and the open position depicted in view 12-II such that sliding portion 1203 moves to one of the closed position and the open position depending on a position of sliding portion 1203 relative to device holding portion 1202. Hence, in these implementations, biasing mechanism 1301 comprises two equilibrium positions: the first position and the second position, and will move back and forth between to one of the first position and the second position depending on the displacement of the biasing mechanism 1301.

While in depicted implementations biasing mechanism 1301 comprises a leaf spring 1303, in other implementations, biasing mechanism 1301 can include, but is not limited to, one or more of a spring, a leaf spring, a slider device, and the like. For example, biasing mechanism 1301 can comprise a slider similar to that used on slider mobile electronic devices, slider keyboards and the like.

While not depicted, it is further appreciated that carrying case 1201 can comprise rails, and the like, at one or more of sliding portion 1203, front wall 1205 and side walls 1209, and that sliding portion 1203 can move between the closed position and the open position on the rails.

It is further appreciated that sliding portion 1203 need not be biased to one or more of the closed position and the open position. Rather, in yet further implementations, sliding portion 1203 can comprise a friction slider that can be frictionally retained at positions between the closed position and the open position.

Attention is next directed to FIG. 14, which is substantially similar to FIG. 12, with like elements having like numbers and depicts carrying case 1201 and device 101c received in device holding portion 1202, carrying case 1201 being held by a hand 1401. In view 14-I of FIG. 14, sliding portion 1203 is in the closed position and in view 14-II, sliding portion 1203 is in the open position. When device 101c is received in device holding portion 1202, and when sliding portion 1203 is in the closed position, as in view 14-I, sliding portion 1203 obscures gap 1206, and hence further obscures an indicator at device 101c, for example display 126c. In view 14-I, however, device 101c is receiving a call, as indicated by notification 1403, which can comprise an aural notification (e.g. device 101c is "ringing") and/or a visual notification (e.g. a light at device 101c is flashing). Hence, the user holding carrying case 1201 uses a thumb of hand 1401 to move sliding portion 1203 to the open position, as indicated by arrow 1405 to view and/or "peek" at display 126c, rather than removing device 101c at least partially from carrying case 1201 to view display 126c.

However, notification 1403 can also be provided when any event occurs at device 101c, including, but not limited to receiving a message, a calendar event, and the like.

Furthermore, in some implementations, one or more of sliding portion 1203 and/or device 101c can be configured such that indicator 135c of device 101c is exposed when sliding portion 1203 is in the closed position. For example, indicator 135c can be located at device 101c such that indicator 135c is not obscured when sliding portion 1203 is in the closed position, for example indicator 135c can be located on a top side of device 101c. Alternatively, a shape of sliding portion 1203 can be configured such that indicator 135c is not obscured in the open position: for example, sliding portion 1203 can comprise a cut-out, an aperture and the like corresponding to a position of indicator 135c when device 101c is received in carrying case 1201 and sliding portion 1203 is in the closed position. In yet a further alternative, sliding portion 1203 can be at least partially transparent in at least an area corresponding to a position of indicator 135c when device 101c is received in carrying case 1201 and sliding portion 1203 is in the closed position. Regardless, in these implementations, indicator 135c can be controlled to provide a visual notification of an event at device 101c, either in addition to notification 1403 or in place of notification 1403, for example indicator 135c can comprise a light which can be controlled to blink, change colour and the like to provide the visual notification.

When sliding portion 1203 is moved to the open position, as in view 14-II, gap 1206 is exposed and further at least a portion of indicator/display 126c of device 101c is exposed. It is appreciated that a location of gap 1206 generally corresponds to a location of an indicator and/or at least a portion of display 126c when device 101c is received in device holding portion 1202.

Hence, carrying case 1201 can be used to "peek" at indicator/display 126c of device 101c by moving sliding portion 1203 to the open position. Specifically, as depicted, a user can move sliding portion 1203 from the closed position to the open position in order to "peek" at display 126c of device 101c through gap 1206 (not numbered in FIG. 14, but assumed to be) to view caller ID (identification) information. In other words, device 101c determines that carrying case 1201 is in an open configuration and controls display 126c to a given notification mode, as described above.

In depicted implementations, the given notification mode of display 126c includes the caller ID information (e.g. "Call from Sally") and a virtual "Answer" button 1407 which, when actuated, causes the call to be answered at device 101c.

However, moving sliding portion 1203 to the open position can be used to generally "peek" at display 126c of device 101c, regardless of whether a phone call is received or not. For example, when carrying case 1201 is used with device 101c, device 101c can detect when sliding portion 1203 is in the open position (e.g. carrying case 1201 is in an open configuration) and indicator/display 126c of device 101c can be placed in a given notification mode as described above. Indeed, carrying case 1201, with device 101c, received therein, can together be elements of a system for providing a "peek" at display 126c of device 101c.

Attention is next directed to FIG. 15, which is substantially similar to FIG. 14, with like elements having like numbers, however FIG. 15 depicts a carrying case 1501 with device 101c received in a device holding portion 1502 of carrying case 1501, with view 15-I showing a sliding portion 1503 of carrying case 1501 in a closed configuration and view 15-II showing sliding portion 1503 in an open configuration. In other words, carrying case 1501 is substantially similar to carrying case 1201; however, in these implementations, carrying case 1501 comprises an aperture 1550 in a front wall 1505 of carrying case 1501 corresponding to microphone 134c of device 101c when device 101c is received in device holding portion 1502. Hence, when button 1407 is actuated to answer the call, a user can use speaker 132c, which is exposed when sliding portion 1503 is in the open position, and microphone 134c to respectively listen and talk on the call. It is appreciated that aperture 1550 can comprise a screen, a grill and the like configured for sound to pass there through but generally protect microphone 134c.

In implementations where speaker 132c is obscured by carrying case 1501 when sliding portion 1503 is in the open position, carrying case 1501 can further comprise an aperture corresponding to speaker 132c.

Indeed, it is appreciated that each carrying case described herein can comprise one or more apertures in at least one of a device holding portion, a sliding portion, a flap, a wall etc., the one or more apertures corresponding to one or more of a position of a speaker and a microphone of a device, when the device is received by the carrying case, a device holding portion and the like.

It is yet further appreciated that each device described herein can be configured to access given functionality in the described given notification modes, for example to answer a call, an email, a message, a text message and the like. In some of the given notification modes, voice recognition techniques can be used to provide the given functionality when an exposed area of a display that is placed in the given notification mode is too small to provide a virtual keyboard, and the like.

In yet further implementations, each device described herein can be further configured to automatically implement a function when the device detects that it is mated with a carrying case and that the carrying case is in an open configuration. For example, with reference to FIG. 15, in an alternative implementation, device 101c can be configured to answer the call (i.e. implement a function) when sliding portion 1503 is moved to the open position.

Further, the function that is automatically implemented at device 101c (and the like) can further depend on a state of device 101c when sliding portion 1503 (and the like) is moved to the open position and/or when the carrying case is in an open configuration. For example, when device 101c is in a state of receiving a call when sliding portion 1503 is moved to the open position, device 101c can answer the call when sliding portion 1503 is moved to the open position and/or when the carrying case is placed in an open configuration. Alternatively, when device 101c has received a message within a given time period before sliding portion 1503 is moved to the open position, device 101c can implement a message answer function when sliding portion 1503 is moved to the open position and/or when the carrying case is placed in an open configuration. In some implementations, device 101c can store rules and the like, at memory 122c indicating which function is to be implemented when device 101c is in a given state when sliding portion 1503 is moved to the open position, and/or when a carrying case is placed in an open configuration.

Figure 16:
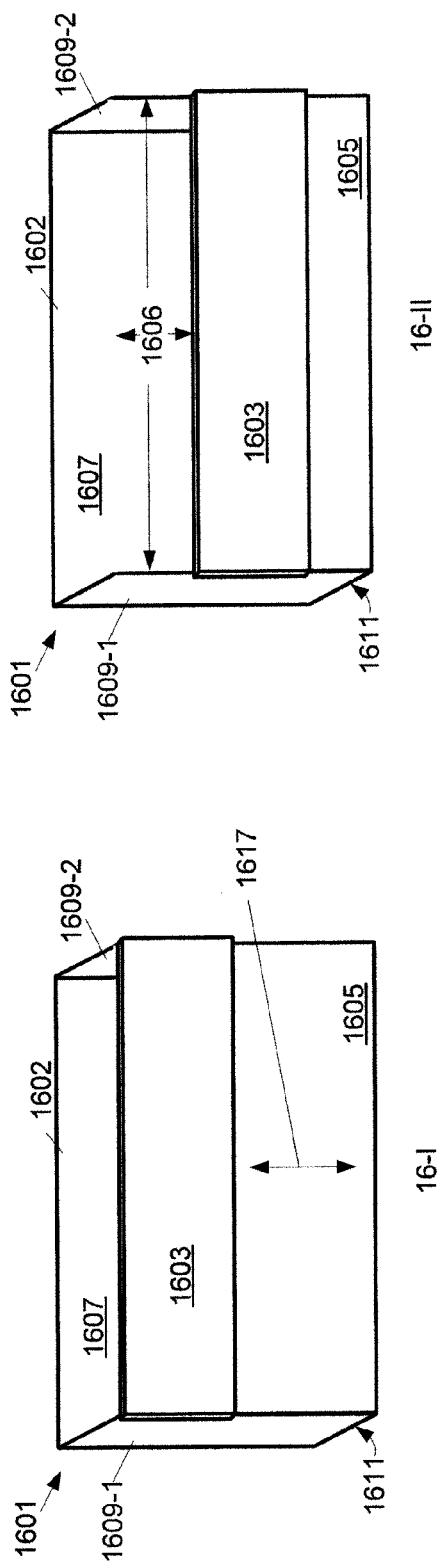
FIG. 16 depicts an alternative carrying case comprising a sliding portion in a closed position and an open position, according to non-limiting implementations.

Attention is next directed to FIG. 16 which depicts views 16-I, 16-II of an alternative implementation of a carrying case 1601, respectively, in a closed configuration and an open configuration, according to non-limiting implementations. Carrying case 1601 is generally similar to carrying case 1201 with like elements having like numbers, however preceded by "16" rather than "12". Hence, carrying case 1601 comprises: a device holding portion 1602 configured to receive a mobile device (not depicted, but similar to devices 101, 101a, 101b, 101c), device holding portion 1602 comprising at least a front wall 1605 and a gap 1606 in front wall 1605 for exposing an indicator of the mobile device, for example as in FIG. 14. Carrying case 1601 further comprises a sliding portion 1603 configured to move between a closed position and an open position, sliding portion 1603 obscuring gap 1606 in the closed position and exposing at least a portion of gap 1606 in the open position, sliding portion 1603 being about planar. Sliding portion 1603 is in the closed position in view 16-I and in the open position in view 16-II.

Device holding portion 1602 generally comprises front wall 1605 and gap 1606 therein as well as an opposing back wall 1607, side walls 1609-1, 1609-2 joining front wall 1605 to back wall 1607, and a bottom wall 1611 such that carrying case 1601 can receive a mobile device therein. Side walls 1609-1, 1609-2 will be interchangeably referred to hereafter, collectively, as side walls 1609 and generically as a side wall 1609. While each of front wall 1605, back wall 1607, side walls 1609 and bottom wall 1611 are depicted as being joined to each other along an entirety of each joining edge, in other implementations, front wall 1605, back wall 1607, side walls 1609, and bottom wall 1611 can be joined at only one or more portions of the joining edges. Further each of front wall 1605, back wall 1607, side walls 1609 and bottom wall 1611 can comprise gaps, apertures and the like, other than gap 1606.

From at least view 16-I, it is apparent that device holding portion 1602 comprises a lateral axis 1617 (i.e. carrying case 1601 in general, and device holding portion 1602 in particular, has a length, and a width that is less than the length, lateral axis 1617 along the width).

Further, in depicted implementations, device holding portion 1602 is configured to receive a mobile device along lateral axis 1617. In other words, device holding portion 1602 is at least partially open at an end opposite bottom wall 1611 such that a mobile device can be received therein.

In other words, carrying case 1601 is configured to receive a mobile device "sideways" and/or in a landscape orientation, in contrast to carrying case 1501 which is configured to receive a mobile device in a portrait orientation.

Figure 17:
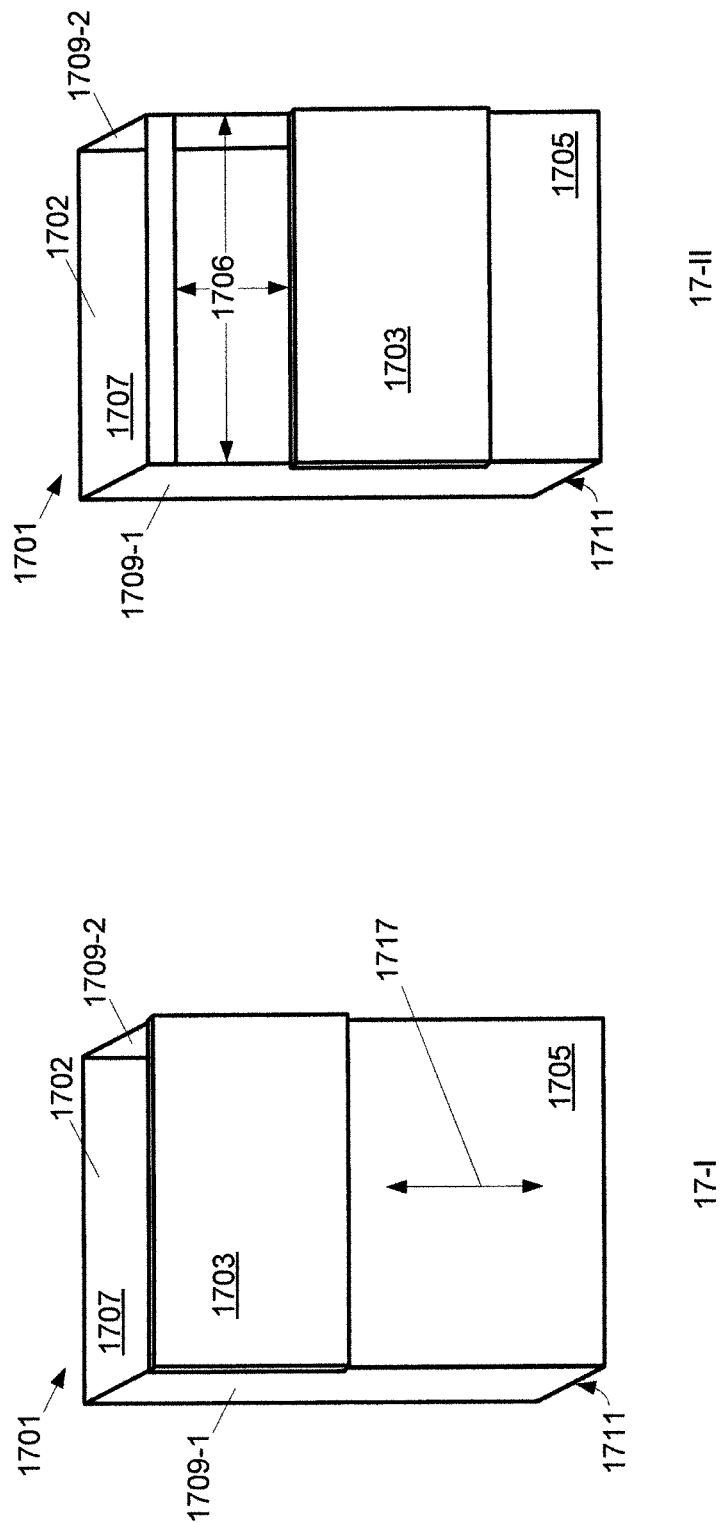
FIG. 17 depicts an alternative carrying case comprising a sliding portion in a closed position and an open position, according to non-limiting implementations.

Attention is next directed to FIG. 17 which depicts views 17-I, 17-II of an alternative implementation of a carrying case 1701, respectively, in a closed configuration and an open configuration, according to non-limiting implementations. Carrying case 1701 is generally similar to carrying case 1201 with like elements having like numbers, however preceded by "17" rather than "12". Hence, carrying case 1701 comprises: a device holding portion 1702 configured to receive a mobile device (not depicted, but similar to devices 101, 101a, 101b, 101c), device holding portion 1702 comprising at least a front wall 1705 and a gap 1706 in front wall 1705 for exposing an indicator of the mobile device, for example as in FIG. 14. Carrying case 1701 further comprises a sliding portion 1703 configured to move between a closed position and an open position, sliding portion 1703 obscuring gap 1706 in the closed position and exposing at least a portion of gap 1706 in the open position, sliding portion 1703 being about planar. Sliding portion 1703 is in the closed position in view 17-I and in the open position in view 17-II.

Device holding portion 1702 generally comprises front wall 1705 and gap 1706 therein as well as an opposing back wall 1707, side walls 1709-1, 1709-2 joining front wall 1705 to back wall 1707, and a bottom wall 1711 such that carrying case 1701 can receive a mobile device therein. Side walls 1709-1, 1709-2 will be interchangeably referred to hereafter, collectively, as side walls 1709 and generically as a side wall 1709. While each of front wall 1705, back wall 1707, side walls 1709 and bottom wall 1711 are depicted as being joined to each other along an entirety of each joining edge, in other implementations, front wall 1705, back wall 1707, side walls 1709, and bottom wall 1711 can be joined at only one or more portions of the joining edges. Further each of front wall 1705, back wall 1707, side walls 1709 and bottom wall 1711 can comprise gaps, apertures and the like, other than gap 1706.

However, in these implementations, gap 1706 comprises an aperture in front wall 1705, in contrast to gaps 1206, 1606 which comprise a cut-out of a respective front wall 1205, 1605. In yet further implementations, one or more of gaps 1206, 1606, 1706 can comprise a window, including, but not limited to, a glass window, a plastic window and the like. In some of these implementations, the window can comprise an aperture corresponding to a position of speaker 132c.

Figure 18:
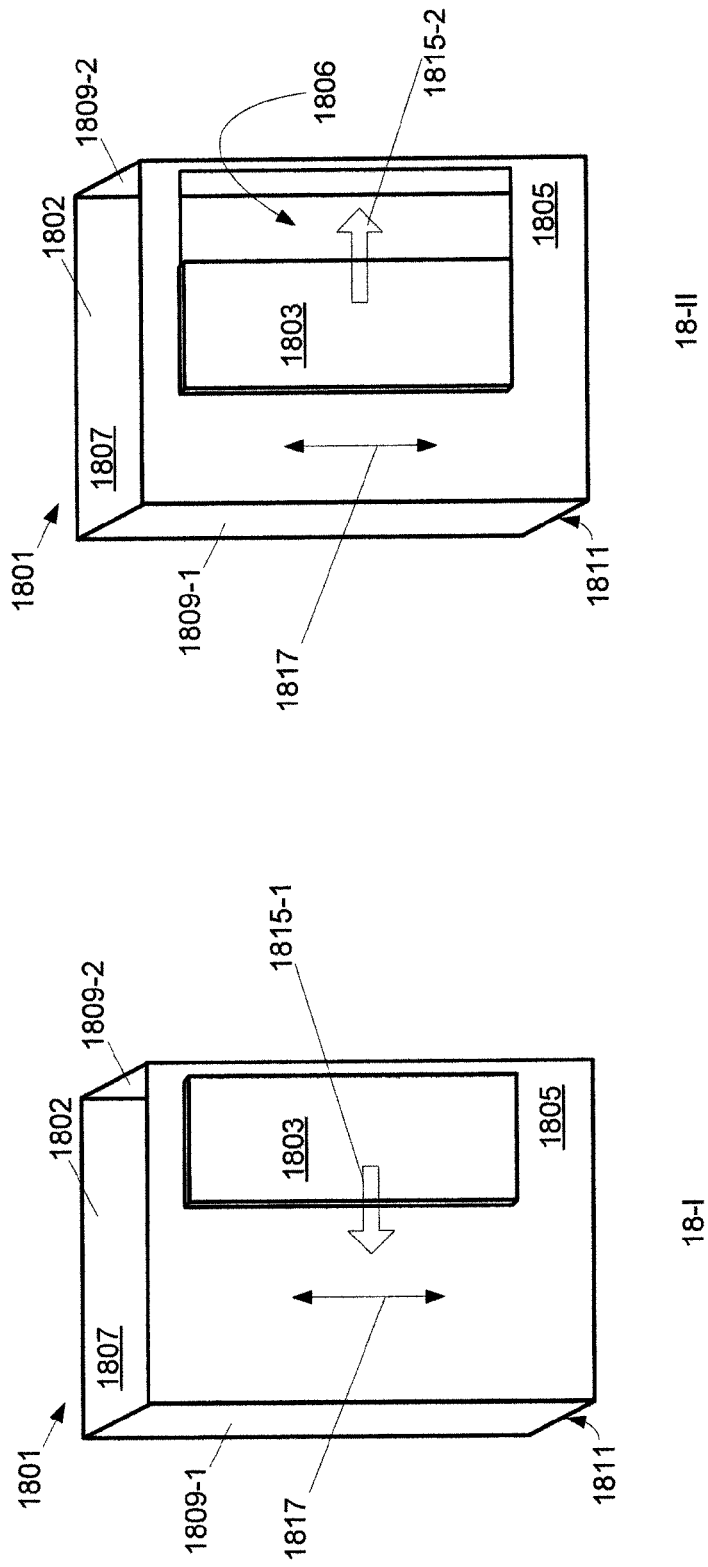
FIG. 18 depicts an alternative carrying case comprising a sliding portion in a closed position and an open position, according to non-limiting implementations.

Attention is next directed to FIG. 18 which depicts views 18-I, 18-II of an alternative implementation of a carrying case 1801, respectively, in a closed configuration and an open configuration, according to non-limiting implementations. Carrying case 1801 is generally similar to carrying case 1201 with like elements having like numbers, however preceded by "18" rather than "12". Hence, carrying case 1801 comprises: a device holding portion 1802 configured to receive a mobile device (not depicted, but similar to devices 101, 101a, 101b, 101c), device holding portion 1802 comprising at least a front wall 1805 and a gap 1806 in front wall 1805 for exposing an indicator of the mobile device, for example as in FIG. 14. Carrying case 1801 further comprises a sliding portion 1803 configured to move between a closed position and an open position, sliding portion 1803 obscuring gap 1806 in the closed position and exposing at least a portion of gap 1806 in the open position, sliding portion 1803 being about planar. Sliding portion 1803 is in the closed position in view 18-I and in the open position in view 18-II.

Device holding portion 1802 generally comprises front wall 1805 and gap 1806 therein as well as an opposing back wall 1807, side walls 1809-1, 1809-2 joining front wall 1805 to back wall 1807, and a bottom wall 1811 such that carrying case 1801 can receive a mobile device therein. Side walls 1809-1, 1809-2 will be interchangeably referred to hereafter, collectively, as side walls 1809 and generically as a side wall 1809. While each of front wall 1805, back wall 1807, side walls 1809 and bottom wall 1811 are depicted as being joined to each other along an entirety of each joining edge, in other implementations, front wall 1805, back wall 1807, side walls 1809, and bottom wall 1811 can be joined at only one or more portions of the joining edges. Further each of front wall 1805, back wall 1807, side walls 1809 and bottom wall 1811 can comprise gaps, apertures and the like, other than gap 1806.

However, in these implementations, gap 1806 comprises an aperture in front wall 1805 that is laterally offset towards side wall 1809-2, and further has a length and width less than the length, the length being generally parallel to a longitudinal axis of carrying case 1801. Accordingly, sliding portion 1803 is configured to move between the closed position of view 18-I and the closed position of view 18-II laterally and/or perpendicular to longitudinal axis 1817, as indicated by arrows 1815-1, 1815-2. Further device holding portion 1802 comprises an opening opposite bottom wall 1811 for receiving a mobile device in a portrait orientation, along longitudinal axis 1817.

In other words, a location of gap 1806 and sliding portion 1803 is generally appreciated to be non-limiting, as long as gap 1806 and sliding portion 1803 correspond to a position of an indicator of a device and/or at least a portion of a display of the device when the device is received in device holding portion 1802.

It is appreciated that heretofore, sliding portions 1203, 1503, 1603, 1703 have been described that leave at least a portion of respective front walls 1205, 1505, 1605, 1705 exposed, and/or visible. However, present implementations are not so limiting.

Figure 19:
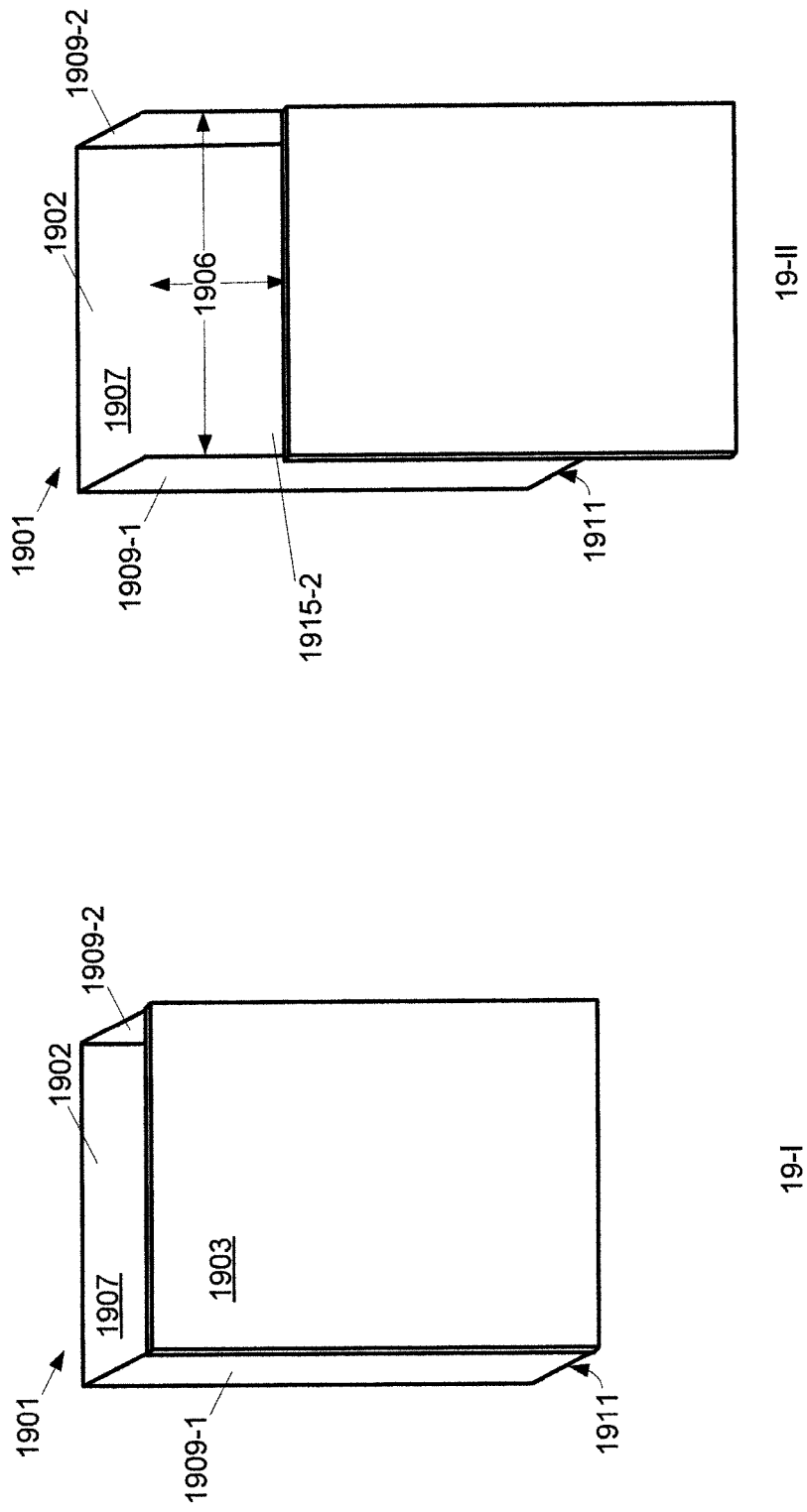
FIG. 19 depicts an alternative carrying case comprising a sliding portion in a closed position and an open position, according to non-limiting implementations.

For example attention is next directed to FIG. 19 which depicts views 19-I, 19-II of an alternative implementation of a carrying case 1901, respectively, in a closed configuration and an open configuration, according to non-limiting implementations. Carrying case 1901 is generally similar to carrying case 1201 with like elements having like numbers, however preceded by "19" rather than "12". Hence, carrying case 1901 comprises: a device holding portion 1902 configured to receive a mobile device (not depicted, but similar to devices 101, 101a, 101b, 101c), device holding portion 1902 comprising at least a front wall (not visible) and a gap 1906 in the front wall for exposing an indicator of the mobile device, for example as in FIG. 14. Carrying case 1901 further comprises a sliding portion 1903 configured to move between a closed position and an open position, sliding portion 1903 obscuring gap 1906 in the closed position and exposing at least a portion of gap 1906 in the open position, sliding portion 1903 being about planar. Sliding portion 1903 is in the closed position in view 19-I and in the open position in view 19-II.

Device holding portion 1902 generally comprises the front wall and gap 1906 therein as well as an opposing back wall 1907, side walls 1909-1, 1909-2 joining the front wall to back wall 1907, and a bottom wall 1911 such that carrying case 1901 can receive a mobile device therein. Side walls 1909-1, 1909-2 will be interchangeably referred to hereafter, collectively, as side walls 1909 and generically as a side wall 1909. While each of the front wall, back wall 1907, side walls 1909 and bottom wall 1911 are depicted as being joined to each other along an entirety of each joining edge, in other implementations, the front wall, back wall 1907, side walls 1909, and bottom wall 1911 can be joined at only one or more portions of the joining edges. Further each of the front wall, back wall 1907, side walls 1909 and bottom wall 1911 can comprise gaps, apertures and the like, other than gap 1906.

However, in these implementations, sliding portion 1903 covers the front wall in the closed position. Hence, indeed, sliding portion 1903 can be of any size that obscures gap 1906 when sliding portion 1903 is in the closed position.

It is further appreciated that while sliding portions described herein are generally about planar, planar is not to be construed as being perfectly flat, but merely covering a planar area, for example, gaps described herein. For example, sliding portions described herein can further include raised portions, for example for functional and/or aesthetic purposes. Such raised portions can improve a grip on a respective sliding portion for a user to move a sliding portion. Such raised portions can also provide decorative features that can optionally, but simultaneously, improve a grip on a respective sliding portion.

While sliding portions and gaps described herein are all generally rectangular, present implementations are not so limiting and sliding portions and gaps described herein can be one or more of square, circular, rectangular, triangular, a regular shape, an irregular shape and the like.

Figure 20:
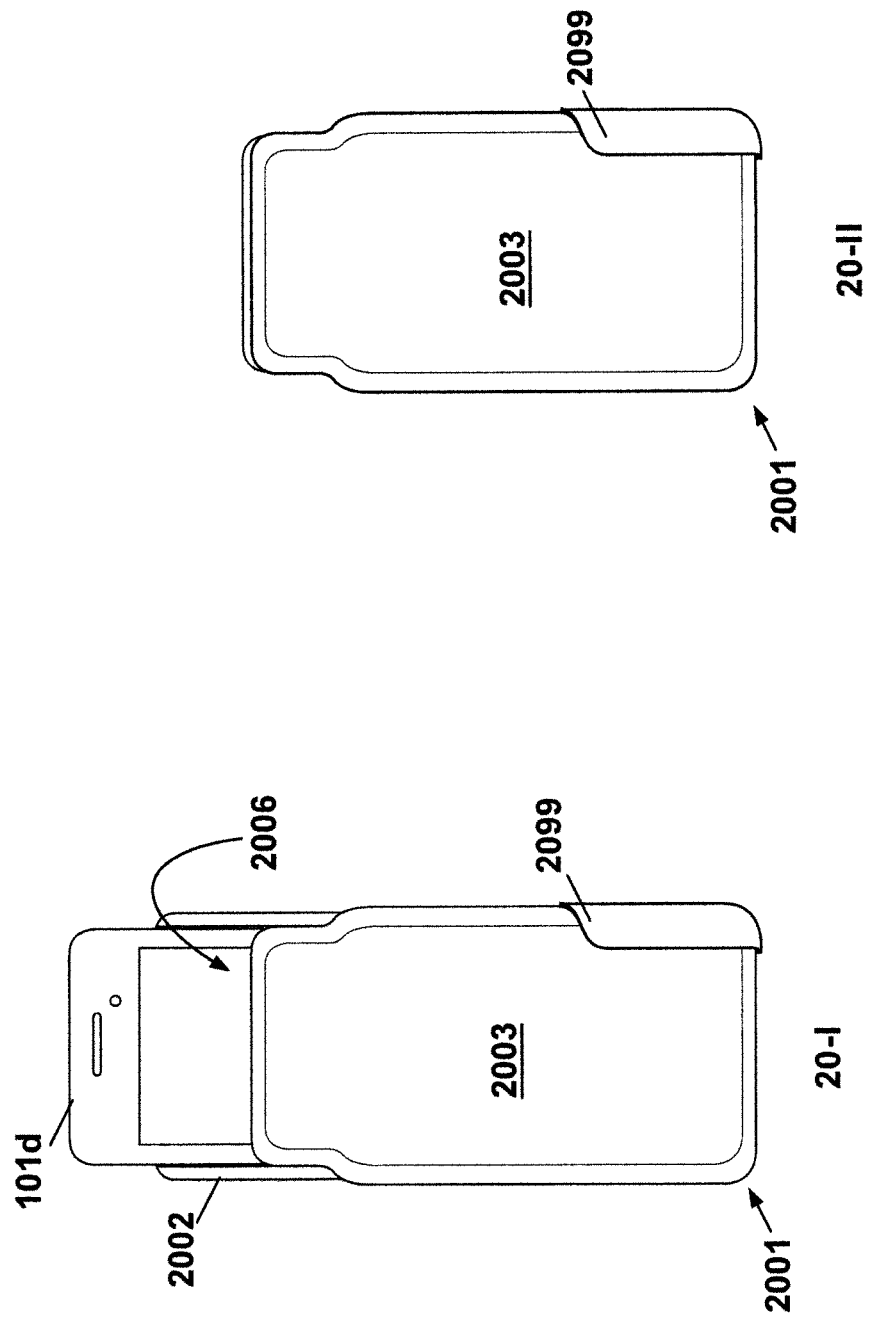
FIG. 20 depicts an alternative carrying case comprising a sliding portion in a closed position and an open position, with a mobile device received therein, according to non-limiting implementations.

Persons skilled in the art will appreciate that there are yet more alternative implementations and modifications possible. For example, attention is next directed to FIG. 20 which depicts views which depicts views 20-I, 20-II of an alternative implementation of a carrying case 2001, respectively, in a closed configuration and an open configuration, according to non-limiting implementations. Carrying case 2001 comprises: a device holding portion 2002 configured to receive a device 101d (similar to devices 101, 101a, 101b, 101c), a device holding portion 2002 (not visible in view 20-II) comprising at least a gap 2006 for exposing an indicator of device 101d. Carrying case 2001 further comprises a sliding portion 2003 configured to move between a closed position and an open position, sliding portion 2003 obscuring gap 2006 in the closed position and exposing at least a portion of gap 2006 in the open position, sliding portion 2003 being about planar. Sliding portion 2003 is in the closed position in view 20-I and in the open position in view 20-II.

Figure 21:
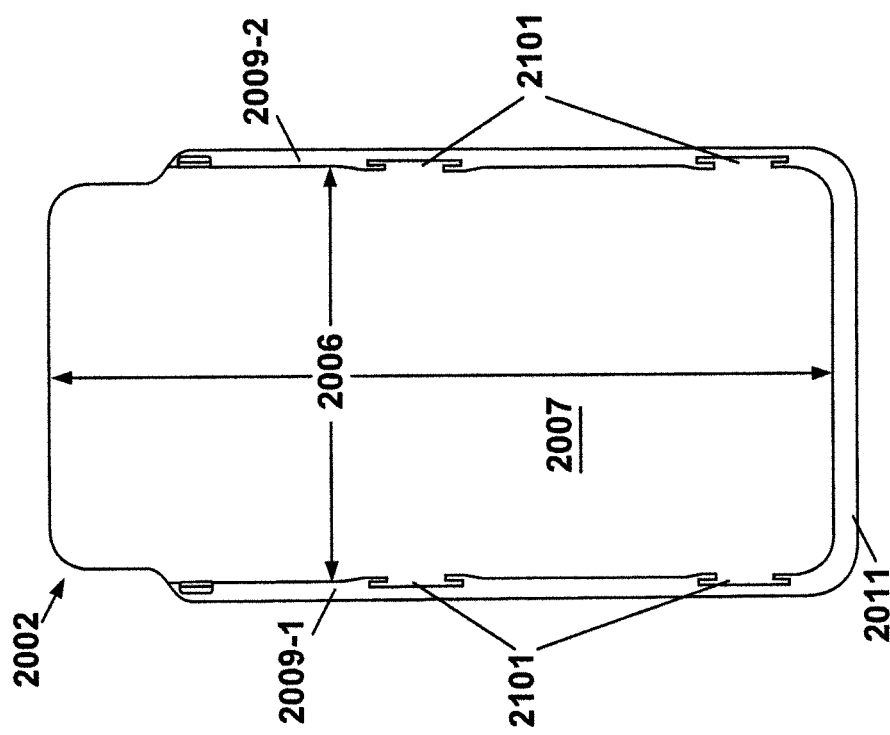
FIG. 21 depicts a device holding portion of the carrying case of FIG. 20 according to non-limiting implementations.

In implementations depicted in FIG. 21, sliding portion 2003 further comprises a raised decorative portion 2099, which can also be used to improve a user's grip on carrying case 2001; indeed, raised decorative portion 2099 illustrates that while sliding portion 2003 is generally about planar, such planarity can include raised portions at least on an exterior of sliding portion 2003.

With reference to FIG. 21, which depicts device holding portion 2002 without sliding portion 2003, device holding portion 2002 generally comprises a back wall 2007, side walls 2009-1, 2009-2, and a bottom wall 2011 such that carrying case 2001 can receive a mobile device therein. Side walls 2009-1, 2009-2 will be interchangeably referred to hereafter, collectively, as side walls 2009 and generically as a side wall 2009. While each of back wall 2007, side walls 2009 and bottom wall 2011 are depicted as being joined to each other along an entirety of each joining edge, in other implementations, back wall 2007, side walls 2009, and bottom wall 2011 can be joined at only one or more portions of the joining edges. Further each of back wall 2007, side walls 2009 and bottom wall 2011 can comprise gaps, apertures and the like, other than gap 2006.

In any event, in these implementations, device holding portion 2002 does not comprise a front wall, but rather gap 2006 is formed by side walls 2009 and bottom wall 2011. Put another way, a front section of device holding portion 2002 is open and forms gap 2006.

From FIG. 21 it is further apparent that side walls 2009 of device holding portion 2002 comprise opposing biased portions 2101 extending laterally towards each other for frictionally retaining device 101d when received therein.

Figure 22:
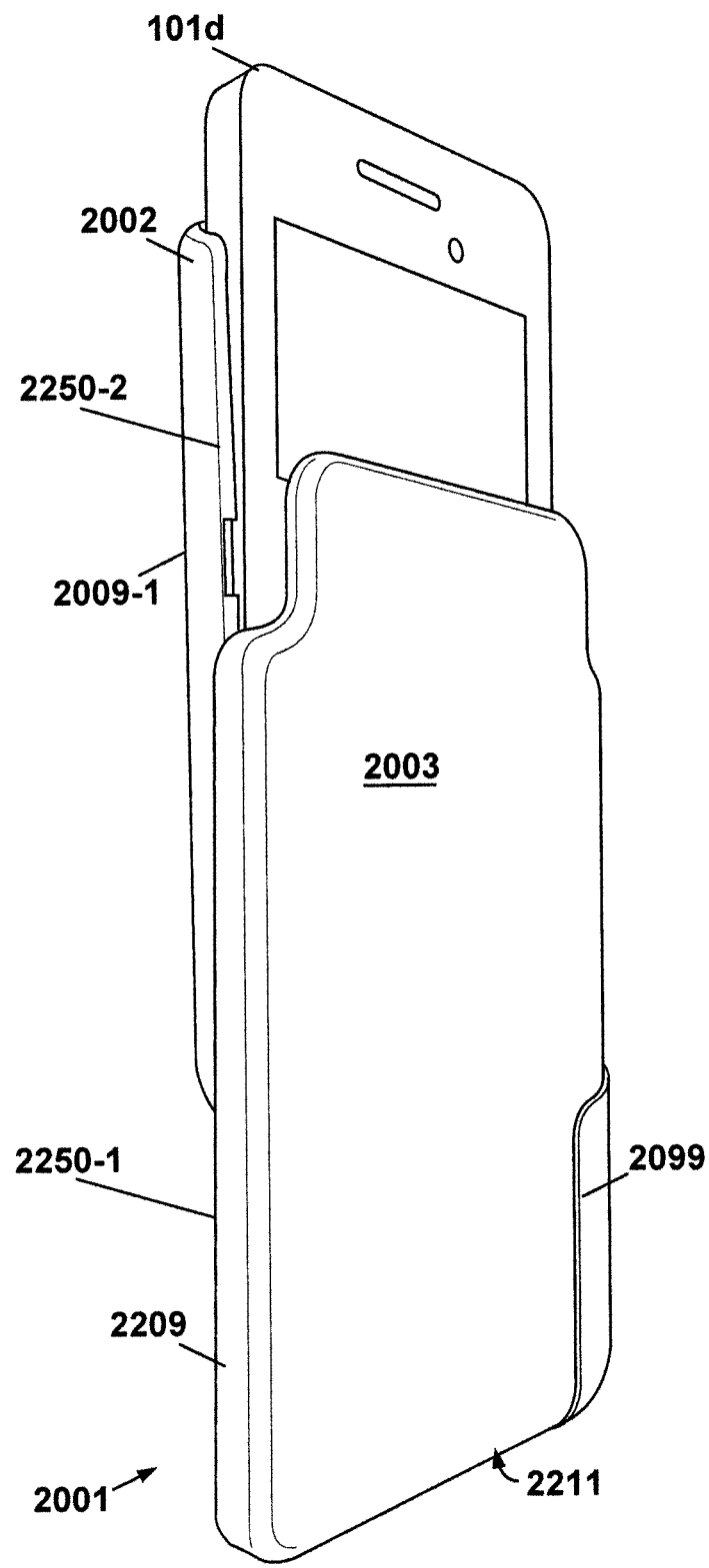
FIG. 22 depicts a perspective side view of the carrying case of FIG. 20, according to non-limiting implementations.

Attention is now directed to FIG. 22 which depicts a perspective view of carrying case 2001 with device 101d received in device holding portion 2002, and sliding portion 2003 in the open position. Side wall 2009-1 of device holding portion 2002 is also visible in FIG. 22. From FIG. 22, it is further apparent that while sliding portion 2003 is generally planar, sliding portion 2003 further comprises side walls 2209 (though only one of which is visible in FIG. 22) that comprise rails 2250-1 complimentary to rails 2250-2 at side walls 2209 of device holding portion 2002. It is further appreciated that rails 2250-1, 2250-2 interlock and slide relative to one another such that sliding portion 2003 moves between the closed position and the open position on rails 2250-1, 2250-2. While rails 2250-1, 2250-2 are only depicted on one side of carrying case 2001, it is appreciated that each of sliding portion 2003 and device holding portion 2002 comprise corresponding similar rails at opposing sidewalls 2009-1, 2009-2. In other words, sliding portion 2003 comprises side walls 2009 that slide along corresponding side walls 2209 of device holding portion 2002.

From FIG. 22 it is apparent that while sliding portion 2003 is about planar, sliding portion 2003 also comprises side walls 2209 and a bottom wall 2211 which are generally perpendicular to the remainder of sliding portion 2003. Indeed, decorative portion 2099, raised side walls 2209 and a bottom wall 2211 illustrate that while sliding portion 2003 is generally about planar, such planarity can include functional and/or decorative elements extending there from.

Figure 23:
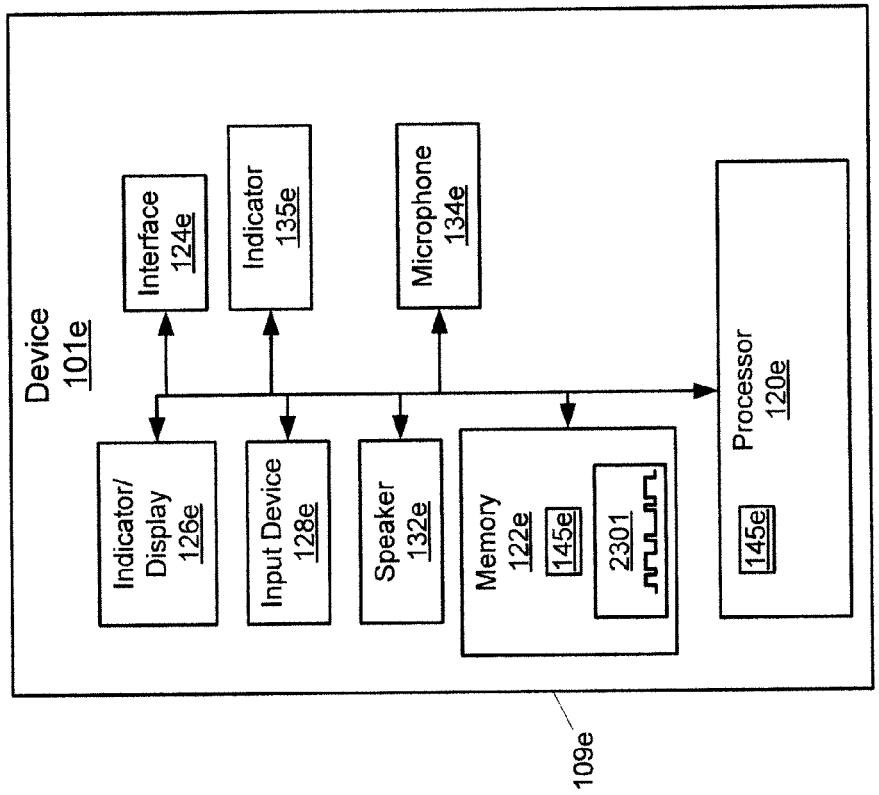
FIG. 23 depicts a block diagram of a device configured to detect when mated with a carrying case by detection of a sound pattern, according to non-limiting implementations.

Attention is next directed to FIG. 23, which is substantially similar to FIG. 4, with like elements having like numbers, however with an "e" appended thereto rather than an "a". FIG. 23 depicts a device 101e comprising a housing 109e, which houses a processor 120e interconnected with: a memory 122e; a communications interface 124e (interchangeably referred to as interface 124e); an indicator comprising a display 126e for providing notifications; an input device 128e; a speaker 132e; at least one microphone 134e; and an indicator 135e. While not depicted, device 101e can further comprise a second detector similar to detector 139 for detecting when a carrying case in which device 101e is received is in an open configuration or a closed configuration.

However, in these implementations, microphone 134e is generally enabled to detect a sound pattern produced when device 101e is received in a carrying case, as described below. Furthermore, processor 120e is generally configured to determine that device 101e is received in a carrying case when at least one microphone 134e detects the sound pattern. Hence, memory 122e can store an application 145e that, when processed by processor 120e (as depicted) causes processor 120e to be configured to determine that device 101e is received in a carrying case when at least one microphone 134e detects the sound pattern. Memory 122e can further store a sound pattern 2301 that can be compared to a sound pattern detected by microphone 134e to determine whether device 101e is received in a carrying case.

Hence, it is appreciated that, in these implementations, microphone 134e can be similar to first detector 137 in that microphone 134e is generally enabled to detect when device 101e is received in a carrying case. Thus, method 300 can also be implemented in device 101e (presuming device 101e comprises a detector similar to detector 139) wherein block 301 is implemented using microphone 134e, block 301 comprising detecting when device 101e is mated with a carrying case by receiving a sound pattern detected by microphone 134e similar to sound pattern 2301. As will be presently described, the sound pattern detected by microphone 134e is generally produced by actuator bumps on one or more of device 101e and a carrying case, the actuator bumps configured to interact with the other of device 101e and the carrying case when device 101e is received in the carrying case to produce a sound pattern detectable by at least one microphone 134e.

Figure 24:
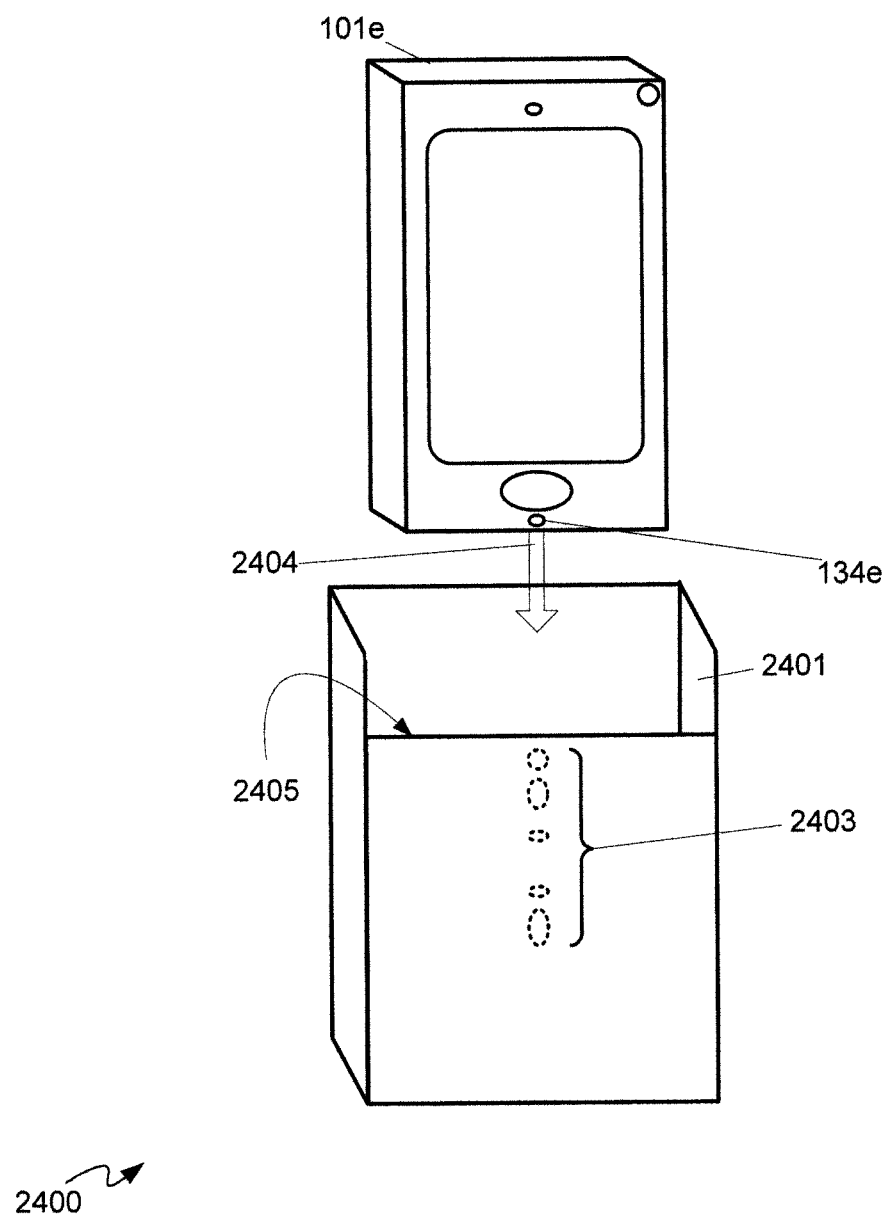
FIG. 24 depicts a system including the device of FIG. 23 and a carrying case comprising actuator bumps for producing a sound pattern detectable at the device, according to non-limiting implementations.

Attention is hence next directed to FIG. 24 which depicts a system 2400 comprising: device 101e comprising at least one microphone 134e and processor 120e (not depicted in FIG. 24, but nonetheless understood to be present); and a carrying case 2401 configured to receive device 101e, one of device 101e and carrying case 2401 comprising actuator bumps 2403 configured to interact with the other of device 101e and carrying case 2401 when device 101e is received in carrying case 2401 to produce a sound pattern detectable by at least one microphone 134e, processor 120e configured to determine that device 101e is received in carrying case 2401 when at least one microphone 134e detects the sound pattern. Receipt of device 101e into carrying case 2401 is indicated by arrow 2404.

Further, in implementations depicted in FIG. 24, actuator bumps 2403 are located on an interior wall 2405 of carrying case 2401, as indicated by actuator bumps 2403 being depicted in stippled lines (i.e. an exterior of carrying case 2401 is depicted in FIG. 24 and actuator bumps 2403 are located on interior wall 2405, hence actuator bumps 2403 would not be visible in the view depicted in FIG. 24). Specifically, actuator bumps 2403 are located on interior wall 2405 of carrying case 2401 such that actuator bumps 2403 interact with at least one microphone 134e to produce the sound pattern.

Figure 25:
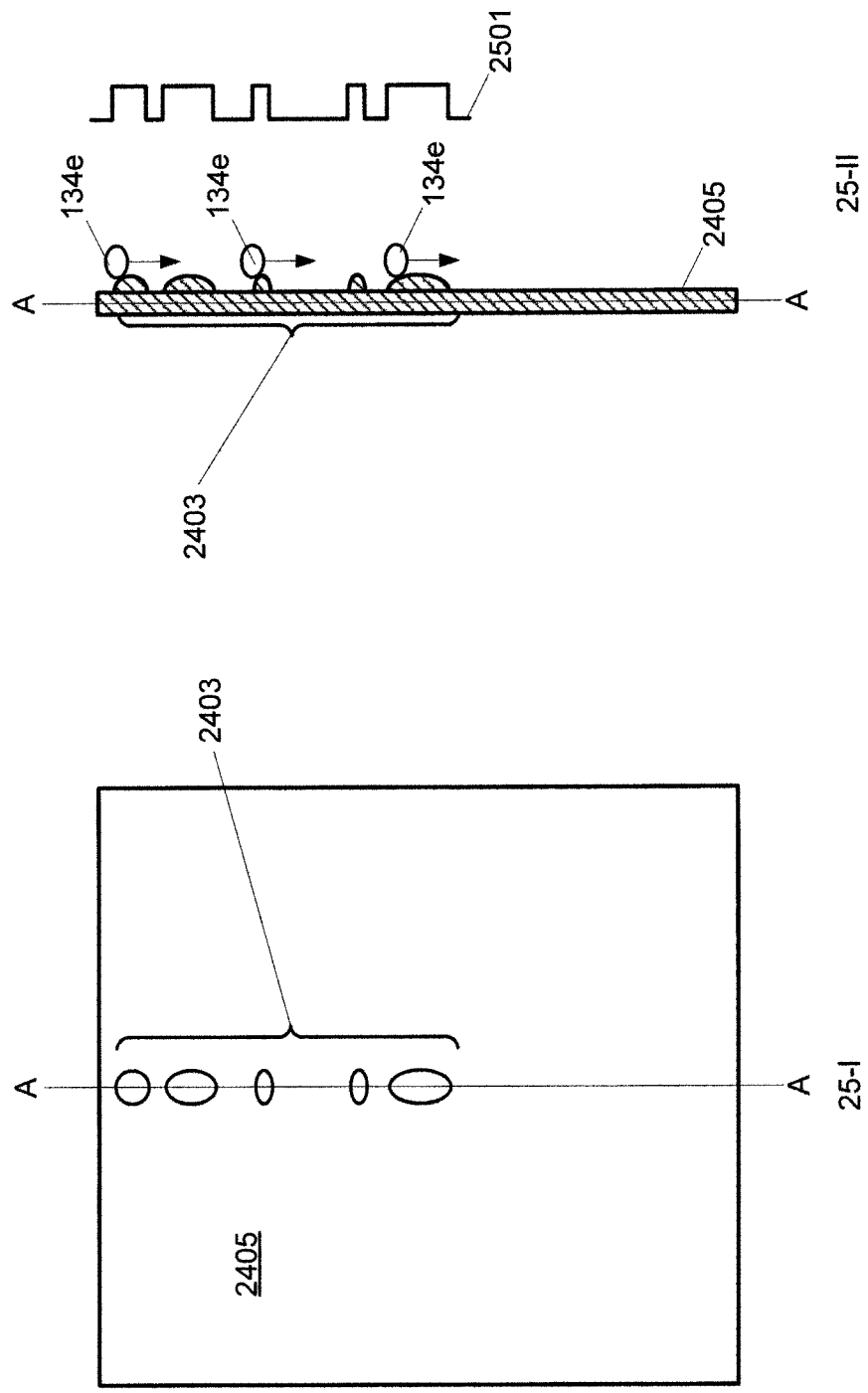
FIG. 25 depicts a perspective view of an interior wall of the carrying case of FIG. 24, and a cross-sectional view of the interior wall along line A-A, according to non-limiting implementations.

Attention is next directed to FIG. 25, which depicts a perspective view 25-I of interior wall 2405, independent of carrying case 2401, and actuator bumps 2403, as well as a cross-sectional view 25-II of interior wall 2405 along line A-A through actuator bumps 2403. From view 25-II it is apparent that actuator bumps 2403 can comprise one or more of bumps, protuberances, nodules and the like that extend from interior wall 2405 and that are located along a line on an interior wall 2405, for example, line A-A.

View 25-II further depicts microphone 134e as device 101e is received (e.g. inserted) in carrying case 2401, microphone 134e interacting with actuator bumps 2403. While the remainder of device 101e is not depicted in FIG. 25, it is appreciated to be nonetheless present. As device 101e is inserted into carrying case 2401, microphone 134e brushes against each of actuator bumps 2403 producing a sound pattern 2501, also depicted in view 25-II. Hence, actuator bumps 2403 have a height that enables actuator bumps 2403 to interact with/brush up against microphone 134e to produce sound pattern 2501.

Peaks in sound pattern 2501 generally correspond to actuator bumps 2403 on a one-to-one basis, and valleys in sound pattern 2501 correspond to areas between actuator bumps 2403 on a one-to-one basis. While peaks of sound pattern 2501 are depicted as a series of square waves, it is appreciated that peaks of sound pattern 2501 can have any shape produceable by microphone 134e interacting with/brushing against actuator bumps 2403.

Furthermore, one or more of a length of actuator bumps 2403 and a distance between actuator bumps 2403 can be configured such that sound pattern 2501 is respective to one or more of carrying case 2401, a class of carrying case 2401 and a type of carrying case 2401. In other words, one or more of carrying case 2401, a class of carrying case 2401 and a type of carrying case 2401 can be identified and/or uniquely identified using sound pattern 2501. For example, the longer a given actuator bump 2403 is along a length of line A-A, the wider a corresponding peak in sound pattern 2501; similarly, the longer a distance between adjacent actuator bumps 2403 along a length of line A-A, the wider a corresponding valley in sound pattern 2501.

In yet further implementations, one or more actuator bumps 2403 can extend further from interior wall 2405 than other actuator bumps 2403 such that peaks of sound pattern 2501 can also vary. In other words, a height of each actuator bump 2403 can be varied.

Hence, one or more of a length of actuator bumps 2403, a distance between actuator bumps 2403, and a height of actuator bumps 2403 can be configured such that the sound pattern is respective to one or more of carrying case 2401, a class of carrying case 2401 and a type of carrying case 2401. In other words, actuator bumps 2403 can be configured similar to a bar code and the like to convey information in the form of sound pattern 2501 to device 101e that, for example, identifies one or more of carrying case 2401, a class of carrying case 2401 and a type of carrying case 2401. For example, sound pattern 2501 can be indicative of an orientation configuration of carrying case 2401 (e.g. indicative of carrying case 2401 receiving device 101e in a portrait orientation (as depicted), a landscape orientation, and the like), whether carrying case 2401 comprises a flap, similar to carrying case 201, whether carrying case 2401 comprises a sliding portion, similar to carrying case 1501, and the like. Indeed, it is appreciated that each carrying case described herein can be adapted to include actuator bumps that are respective to each carrying case such that the carrying case can be identified.

As such, while depicted implementations include five actuator bumps 2403, other implementations can include fewer than five actuator bumps or more than five actuator bumps. In general, present implementations can include any number of actuator bumps for producing a sound pattern that can be detected by microphone 134e such that processor 120e can determine that device 101e is being received in carrying case 2401, or the like.

Further, the area between actuator bumps 2403 can also extend from interior wall 2405, but to a lesser extent than actuator bumps 2403, such that actuator bumps 2403, and the areas in between comprise a ridge extending from interior wall 2405.

In yet further implementations, actuator bumps 2403 located on interior wall of carrying case 2401 and sound pattern 2501 can be respective to one or more of carrying case 2401, a class of carrying case 2401 and a type of carrying case 2401, and processor 120e can be configured to place device 101e into a given notification mode based on sound pattern 2501.

As depicted, actuator bumps 2403 are asymmetrically positioned such that a second sound pattern produced when device 101e is removed from carrying case 2401 is different from sound pattern 2501 produced when device 101e is received in carrying case 2401 and processor 120e can determine when device 101e is inserted and removed from carrying case 2401 based on whether sound pattern 2501 or the second sound pattern is detected.

However, actuator bumps 2403 need not be asymmetric, and can, for example be symmetric such that the same sound pattern is detected when device 101e is inserted and removed from carrying case 2401; in these implementations, processor 120e can be configured to: determine that device 101e is received in carrying case 2401 when at least one microphone 134e detects the sound pattern a first time; and determine that device 101e is received in carrying case 2401 when at least one microphone 134e detects the sound pattern a second time.

Figure 26:
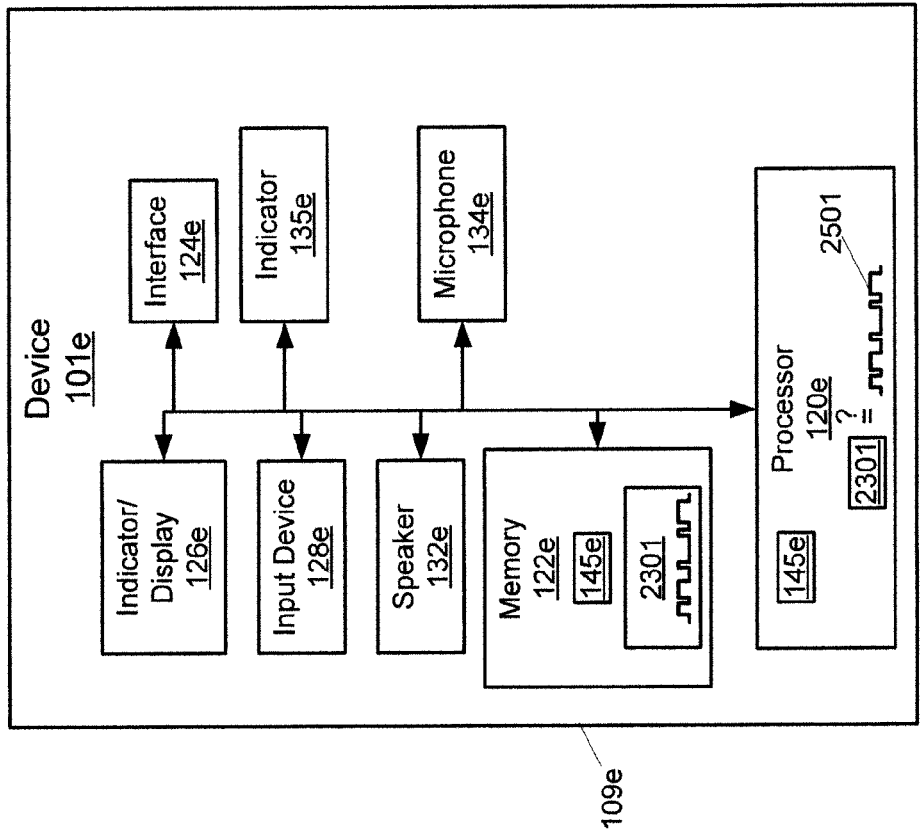
FIG. 26 depicts the device of FIG. 24 detecting a sound pattern and comparing the sound pattern with a stored sound pattern, according to non-limiting implementations.

Attention is next directed to FIG. 26 which is similar to FIG. 23, with like elements having like numbers, depicting processor 120e receiving sound pattern 2501 using microphone 134e and comparing sound pattern 2501 with sound pattern 2301 stored in memory 122e. When sound patterns 2301, 2501 match, as depicted, processor 120e can determine that device 101e is received in carrying case 2401. When sound patterns 2301, 2501 do not match, processor 120e does not determine that device 101e is received in carrying case 2401. In other words, sound pattern 2301 can be stored at memory 122e such that processor 120e can determine when device 101e is received in carrying case 2401. While not depicted, memory 122e can store a plurality of sound patterns corresponding to one or more of different carrying cases, different classes of carrying cases and different types of carrying cases such that one or more of the different carrying cases, different classes of carrying cases and different types of carrying cases can be identified. It is assumed, in these implementations, that a given carrying case corresponding to a sound pattern stored in memory 122e comprises actuator bumps similar to actuator bumps 2403, but respective to the given carrying case. Hence; once a carrying case into which device 101e is being received is identified, and the carrying case has an open configuration and a closed configuration, when block 305 of method 300 is implemented, the given notification mode implemented can be respective to the identified carrying case.

Figure 27:
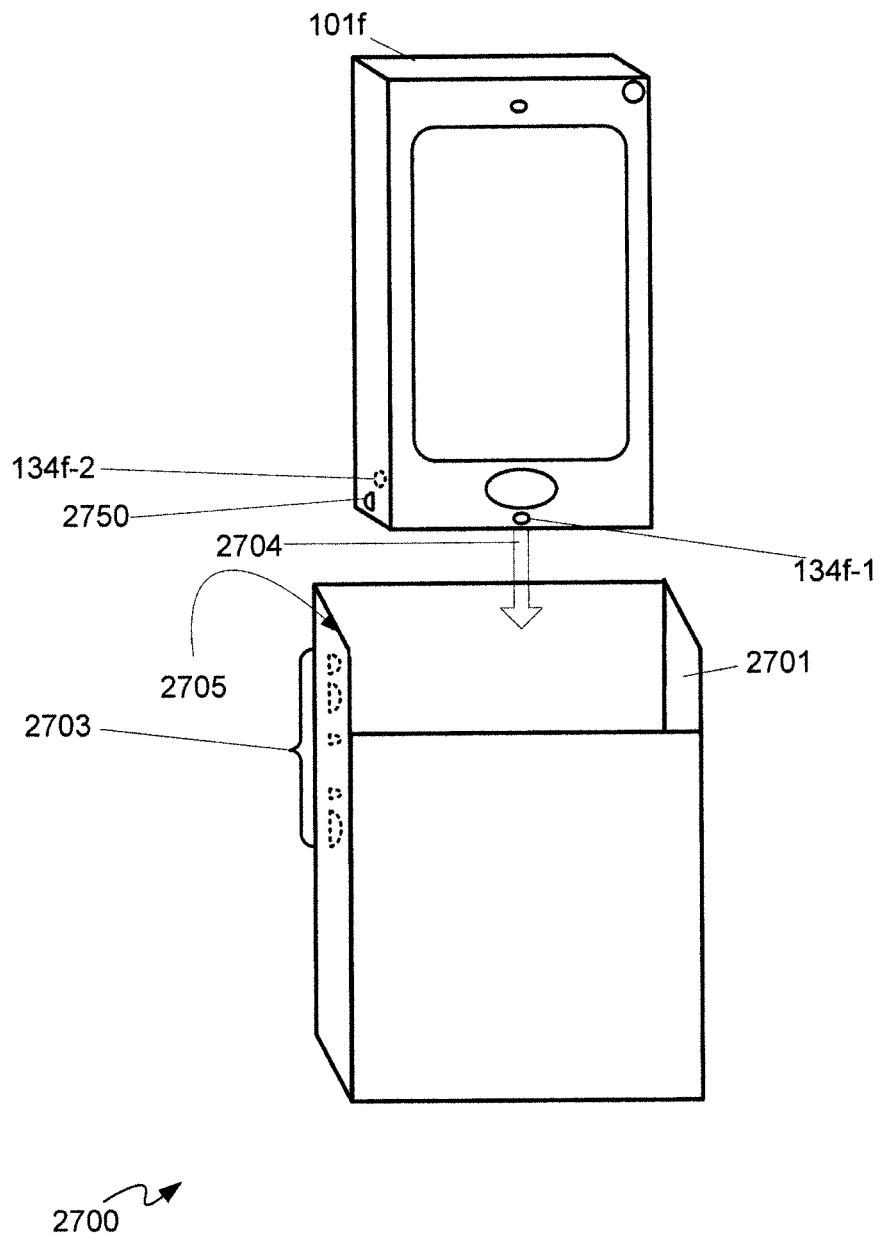
FIG. 27 depicts a system including a device and a carrying case comprising actuator bumps for producing a sound pattern when interacting at an actuator of the device, according to non-limiting implementations.

Attention is hence next directed to FIG. 27 which depicts a system 2700 comprising: device 101f comprising at least one microphone 134f-1 and a processor (not depicted in FIG. 27, but nonetheless understood to be present and further understood to be similar to processor 120e); and a carrying case 2701 configured to receive device 101f, one of device 101f and carrying case 2701 comprising actuator bumps 2703 configured to interact with the other of device 101f and carrying case 2701 when device 101 is received in carrying case 2701 to produce a sound pattern detectable by at least one microphone 134f-1, the processor of device 101f configured to determine that device 101f is received in carrying case 2701 when at least one microphone 134f-1 detects the sound pattern. Receipt of device 101f into carrying case 2701 is indicated by arrow 2704.

Indeed, device 101f is generally similar to device 101e, however device 101f further comprises an actuator 2750 configured to interact with actuator bumps 2703 to produce the sound pattern. In these implementations, actuator 2750 can comprise one or more of a bump, a protuberance, a nodule and the like that extends from side of device 101f, as depicted, along an edge wall of device 101f. As depicted, actuator 2750 is located along a long edge and/or a side wall and/or side edge of device 101f.

Further, in implementations depicted in FIG. 27, actuator bumps 2703 are located on an interior wall 2705 of carrying case 2701, as indicated by actuator bumps 2703 being depicted in stippled lines (i.e. an exterior of carrying case 2701 is depicted in FIG. 27 and actuator bumps 2703 are located on interior wall 2705, hence actuator bumps 2703 would not be visible in the view depicted in FIG. 27). Specifically, actuator bumps 2703 are located on a side interior wall 2705 of carrying case 2701 such that actuator bumps 2703 interact with actuator 2750 to produce the sound pattern. Indeed, actuator bumps 2703 and actuator 2750 are located, respectively, on carrying case 2701 and device 101f so that they interact with each other. Actuator bumps 2703 are otherwise similar to actuator bumps 2403.

In other words, in these implementations, actuator bumps 2703 do not interact with microphone 134*f*-1 directly; rather the sound pattern, similar to sound pattern 2501, is produced by actuator 2750 interacting with actuator bumps 2703. Hence, at least one microphone 134*f*-1 is located to detect the sound pattern when actuator 2750 interacts with actuator bumps 2703. Indeed, actuator bumps 2703 are configured to produce the sound pattern above a noise floor of at least one microphone 134*f*-1.

Alternatively, as depicted, device 101*f* can comprise at least a second microphone 134*f*-2 located to detect the sound pattern when actuator 2750 interacts with actuator bumps 2703. Indeed, in these implementations, actuator bumps 2703 are configured to produce the sound pattern above a noise floor of at least one microphone 134*f*-2. In these implementations, second microphone 134*f*-2 can be located about adjacent and/or about proximal to actuator 2750. In yet further implementations, the sound pattern produced by actuator 2750 interacting with actuator bumps 2703 can be detected by a combination of at least one microphone 134*f*-1 and second microphone 134*f*-2. In yet further implementations, device 101*f* can comprise yet further microphones for detecting the sound pattern.

However, second microphone 134*f*-2 can be optional. Hence, the microphone used to detect the sound pattern can be one of: further configured to receive voice data during a call at device 101*f* (i.e. microphone 134*f*-1); and different from another microphone configured to receive the voice data during a call at device 101*f* (i.e. second microphone 134*f*-2 can be configured to detect the sound pattern while at least one microphone 134*f*-1 can be used for receiving voice data during a call). Regardless, the at least one microphone used to detect the sound patter can be located at one or more of towards a top of device 101*f*, towards a bottom of device 101*f*, adjacent a speaker of device 101*f*, and along an edge of device 101*f*.

In yet further implementations, sliding portions of carrying cases described heretofore (e.g. sliding portions 1113, 1203, 1503, 1603 and the like) can be configured with actuator bumps similar to actuator bumps 2503 which can produce a sound pattern detectable by a complementary device when the sliding portions are opened and closed. Hence, such sound patterns can be used to detect when a sliding portion and/or a carrying case is in an open configuration. In other words, block 303 of method 300 can also be implemented using sound patterns.

Figure 28:
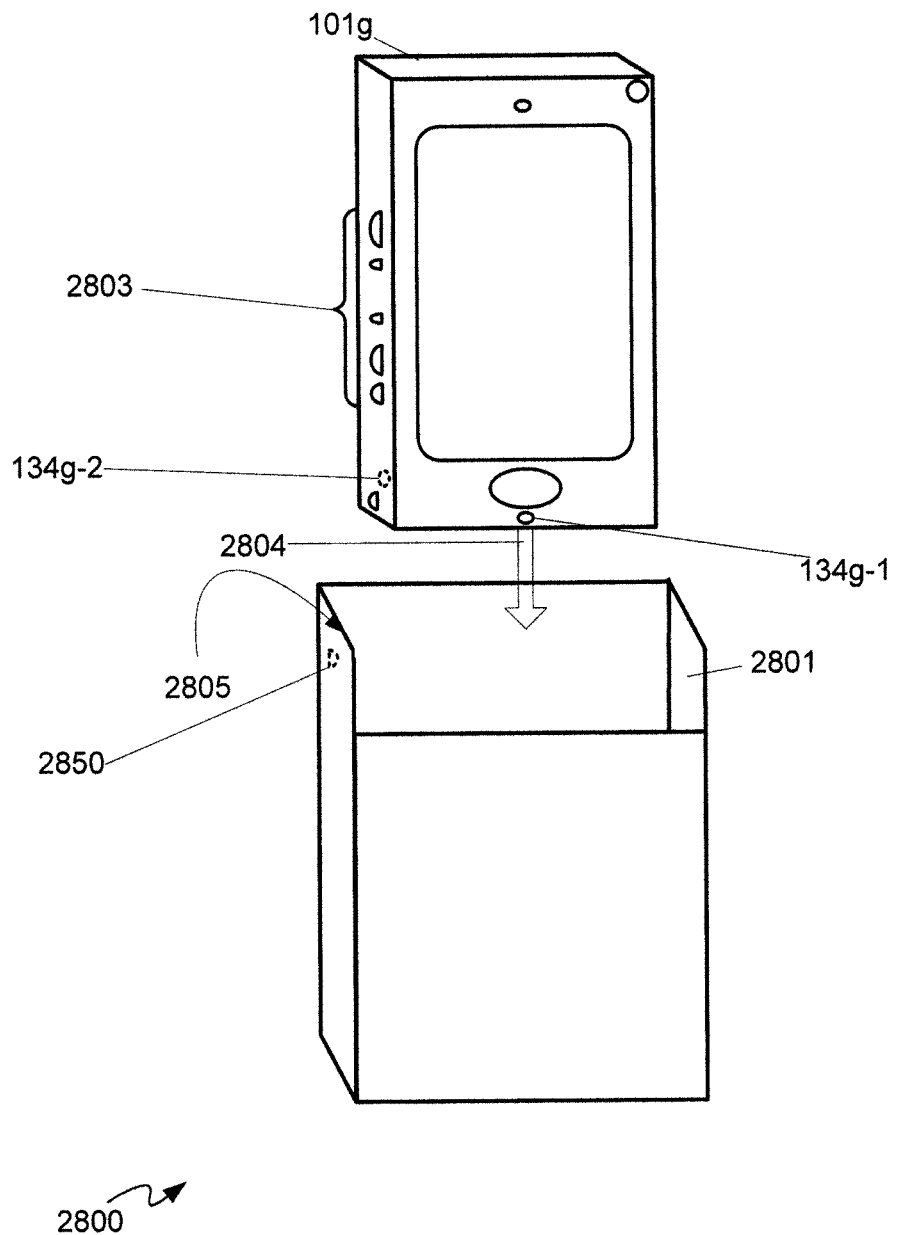
FIG. 28 depicts a system including a device and a carrying case, the device comprising actuator bumps for producing a sound pattern when interacting at an actuator of the carrying case, according to non-limiting implementations.

Attention is next directed to FIG. 28 which depicts a system 2800 comprising: device 101*g* comprising at least one microphone 134*g*-1 and a processor (not depicted in FIG. 28, but nonetheless understood to be present and further understood to be similar to processor 120*e*); and a carrying case 2801 configured to receive device 101*g*, one of device 101*g* and carrying case 2801 comprising actuator bumps 2803 configured to interact with the other of device 101*g* and carrying case 2801 when device 101*g* is received in carrying case 2801 to produce a sound pattern detectable by at least one microphone 134*g*-1, the processor of device 101*g* configured to determine that device 101*g* is received in carrying case 2801 when at least one microphone 134*g*-1, and/or optionally a second microphone 134*g*-2, detects the sound pattern. Receipt of device 101*g* into carrying case 2801 is indicated by arrow 2804.

Indeed, device 101*g* is generally similar to device 101*e*, however in these implementations device 101*g* further comprises actuator bumps 2803 configured to interact with an interior wall 2805 of carrying case 2801 to produce the sound pattern, and specifically an actuator 2850 located on interior wall 2805. Indeed, it is appreciated that system 2800 is similar to system 2700 however actuator bumps 2803 are located at device 101*g* and actuator 2850 is located at carrying case 2801. Further, to produce a sound pattern similar to sound pattern 2501, positions of actuator bumps 2803 are reversed by about 180° relative to actuator bumps 2703.

It is further assumed in implementations described herein that one or more microphones for detecting a sound pattern can be "always on" and/or on when detecting a sound pattern. However, it is further appreciated that the microphones can be turned off, for example, by a respective processor, when entering a carrying case mode; however, when the one or microphones are configured to detect a sound pattern when a respective device is being removed from a carrying case, at least one microphone at a respective device can be on in a carrying case mode and/or "always on". It is further appreciated that microphones described herein for detecting a sound pattern can be directional (e.g. for detecting a sound pattern in a given direction) or omnidirectional.

It is yet further appreciated that devices described herein that use sound patterns to determine when being received and/or removed from a carrying case can further comprise codecs and/or digital signal processors (DSPs) for encoding and/or decoding sound patterns and the like. In some of these implementations, processors described herein can be combined with DSPs.

While implementations described herein have depicted actuator bumps located at one or the other of a device and a carrying case, in yet further implementations the actuator bumps can be distributed between the device and the carrying case and/or located at both the device and the carrying case. Indeed, each of a device and a complementary carrying case can comprise actuator bumps that can interact with each other to produce a sound pattern. In yet further implementations, one or more of a device and a complementary carrying case can comprise more than one set and/or line of actuator bumps such that more than one sound pattern can be produced when the device is being received in the carrying case; indeed, the sound patterns can hence be detected in stereo and/or from different directions and/or by different microphones at the device. Such directionality can also be used to identify the carrying case, as described above, and respective notification mode accordingly implemented at the device.

Hence, it is appreciated that a sound pattern can be produced that can be used to detect when a device is being received in a complementary carrying case, the sound pattern produced when the device is being received in the carrying case. Optionally a second sound pattern and/or the same sound pattern can be produced when the device is being removed from the carrying case. The sound pattern can be produced by actuator bumps located at the device and/or the carrying case, and further the sound pattern can be used to place the device in a given notification mode.

While it is appreciated that the methods described herein could also be used with non-portable devices, the methods may be especially advantageous for mobile electronic devices that are handheld. Implementation of one or more embodiments may realize one or more additional benefits as well, such as flexibility of implementation. Further, this disclosure can be adapted to a variety of mobile electronic devices, a variety of carrying cases and/or holsters, and a variety of bodies, including, but not limited to, planar bodies and skins with open configurations and closed configurations.

Hence, provided herein are various implementations of carrying cases, and devices that can provide notifications when mated with the carrying cases, when the carrying case is in an open configuration. When notifications are provided at a respective display of the devices, when the carrying case is in the open configuration, the methods can be useful for providing a "peek" at the display and/or notifications provided at the display, for example in a status bar. In other words, the carrying case can be placed, even temporarily, in the open configuration, so that notifications at the device can be viewed, rather than take the device out of the carrying case, even partially, to see notifications. Indeed, in implementations where an indicator light is visible at the device while the device is in the carrying case, thereby prompting a user to check notifications at the device, the "peek" at the display can provide the user with more information on the notifications without the user removing the device from the carrying case.

It is further appreciated that carrying cases described herein provide a convenient receptacle for holding/interacting with a device, while simultaneously providing a mechanism to view notifications without removing the device from the carrying case. Further advantages of devices described herein include, but are not limited to: versatility in providing notifications at a device mated with a carrying case, adaptability to a variety of devices, combined functionality of notification devices and a physical protector, compactness, light weight (such that carrying case is portable, thereby supporting handheld implementations and aiding mobility and portability), efficiency, robustness, and enhancing the functionality of a device mated thereto without detracting from other functions of the device.

Those skilled in the art will appreciate that in some implementations, the functionality of devices 101, 101a, 101 b, 101c, 101d, 101e, 101f, 101g can be implemented using pre-programmed hardware or firmware elements (e.g., application specific integrated circuits (ASICs), electrically erasable programmable read-only memories (EEPROMs), etc.), or other related components. In other implementations, the functionality of devices 101, 101a, 101 b, 101c, 101d, 101e, 101f, 101g can be achieved using a computing apparatus that has access to a code memory (not shown) which stores computer-readable program code for operation of the computing apparatus. The computer-readable program code could be stored on a computer readable storage medium which is fixed, tangible and readable directly by these components (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A carrying case comprising:
a device-holding portion configured to receive a mobile device, the device-holding portion comprising a gap for exposing an indicator rendered at a given portion of a display of the mobile device when the mobile device is received in the device-holding portion; and
a sliding portion configured to move between a closed position and an open position, the sliding portion obscuring the gap in the closed position and exposing at least a portion of the gap in the open position, the sliding portion being about planar, a location of the sliding portion and the gap corresponding with the given portion of the display that includes the indicator when the mobile device is received in the device-holding portion, and, when the sliding portion is in the open position, the given portion of the display is exposed in the clap while a remainder of the display is obscured by the device-holding portion, the sliding portion being located to interact with a detector of the mobile device, the mobile device configured to: in response to detecting that the sliding portion is in the open position using the detector, turn on the given portion of the display, while the remaining portion of the display remains off; render the indicator at the given portion of the display; and, in response to detecting that the sliding portion is in the closed position using the detector, turn off the given portion of the display.

2. The carrying case of claim 1, wherein, the device-holding portion comprises at least a front wall and the gap is located in the front wall.

3. The carrying case of claim 1, wherein the gap comprises one or more of an aperture in a front wall of the device-holding portion, a cut-out of the front wall and an opening of the front wall.

4. The carrying case of claim 1, wherein the device-holding portion comprises a longitudinal axis and the device-holding portion is configured to receive the mobile device along the longitudinal axis.

5. The carrying case of claim 4, wherein the sliding portion is configured to move between the closed position and the open position along the longitudinal axis.

6. The carrying case of claim 1, further comprising a biasing mechanism configured to bias the sliding portion to at least the closed position.

7. The carrying case of claim 1, wherein the sliding portion is biased towards the closed position.

8. The carrying case of claim 1, wherein the sliding portion is biased towards both the closed position and the open position such that when the sliding portion is displaced from either of the closed position and the open position, the sliding portion moves to one of the closed position and the open position depending on a position of the sliding portion relative to the device-holding portion.

9. The carrying case of claim 1, further comprising a biasing mechanism configured to bias the sliding portion to both the closed position and the open position such that the sliding portion moves to one of the closed position and the open position depending on a position of the sliding portion relative to the device-holding portion.

10. The carrying case of claim 1, further comprising a biasing mechanism configured to: move the sliding portion to the closed position when the sliding portion is moved more than halfway from the open position towards the closed position; and, move the sliding portion to the open position when the sliding portion is moved more than halfway from the closed position towards the open position.

11. The carrying case of claim 1, further comprising a biasing mechanism configured to bias the sliding portion to at least the closed position.

12. The carrying case of claim 1, wherein the sliding portion is configured to be frictionally retained at positions between the closed position and the open position.

13. The carrying case of claim 1, wherein a size of the sliding portion is about a same size as the gap.

14. The carrying case of claim 1, wherein the sliding portion covers a front wall of the device-holding portion in both the open position and the closed position, the front wall comprising the gap.

15. The carrying case of claim 1, wherein the sliding portion comprises side walls that slide along corresponding side walls of the device-holding portion.

16. The carrying case of claim 1, wherein the sliding portion is configured to be operated with one hand.

17. The carrying case of claim 1, further comprising one or more apertures in at least one of the device-holding portion and the sliding portion, the one or more apertures corresponding to one or more of a position of a speaker and a microphone of the mobile device, when the mobile device is received by the device-holding portion.

18. A system comprising:
a mobile device comprising a detector and a display; and,
a carrying case comprising:
 a device-holding portion configured to receive the mobile device, the device-holding portion comprising a gap for exposing an indicator rendered at a given portion of the display of the mobile device when the mobile device is received in the device-holding portion; and
 a sliding portion configured to move between a closed position and an open position, the sliding portion obscuring the gap in the closed position and exposing at least a portion of the gap in the open position, the sliding portion being about planar, a location of the sliding portion and the gap corresponding with the given portion of the display that includes the indicator when the mobile device is received in the device-holding portion, and, when the sliding portion is in the open position, the given portion of the display is exposed in the gap while a remainder of the display is obscured by the device-holding portion, the sliding portion being located to interact with the detector of the mobile device,
the mobile device configured to: in response to detecting that the sliding portion is in the open position using the detector, turn on the given portion of the display, while the remaining portion of the display remains off; render the indicator at the given portion of the display; and, in response to detecting that the sliding portion is in the closed position using the detector, turn off the given portion of the display.

* * * * *